US012423011B2

(12) United States Patent
Lee et al.

(10) Patent No.: US 12,423,011 B2
(45) Date of Patent: Sep. 23, 2025

(54) COMPUTING SYSTEM GENERATING MAP DATA, AND METHOD OF OPERATING THE SAME

(71) Applicant: SAMSUNG ELECTRONICS CO., LTD., Suwon-si (KR)

(72) Inventors: Chon Yong Lee, Suwon-si (KR); Kyunghan Lee, Suwon-si (KR); Seongsik Hwang, Suwon-si (KR); Jae-Gon Lee, Suwon-si (KR); Kyung-Chang Ryoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 70 days.

(21) Appl. No.: 18/140,420

(22) Filed: Apr. 27, 2023

(65) Prior Publication Data
US 2023/0359379 A1 Nov. 9, 2023

(30) Foreign Application Priority Data
May 6, 2022 (KR) .................. 10-2022-0056024

(51) Int. Cl.
*G06F 3/06* (2006.01)
(52) U.S. Cl.
CPC ............ *G06F 3/064* (2013.01); *G06F 3/0656* (2013.01); *G06F 3/0683* (2013.01)
(58) Field of Classification Search
CPC ...... G06F 3/064; G06F 3/0656; G06F 3/0683; G06F 3/0631; G06F 3/0635; G06F 3/0679; G06F 3/0622; G06F 3/061; G06F 13/42; G06F 3/0629; G06F 13/382; G06F 12/0802; G06F 12/0246; G06F 12/1009
See application file for complete search history.

(56) References Cited

U.S. PATENT DOCUMENTS

| | | | |
|---|---|---|---|
| 10,001,924 B2 | 6/2018 | Sharma et al. | |
| 10,725,859 B2 | 7/2020 | Bolkhovitin et al. | |
| 10,996,881 B2 | 5/2021 | Jung et al. | |
| 11,074,189 B2 | 7/2021 | Abulila et al. | |
| 2015/0032942 A1* | 1/2015 | de la Iglesia | G06F 11/2094 711/103 |
| 2018/0136875 A1 | 5/2018 | Nimmagadda et al. | |
| 2020/0042460 A1* | 2/2020 | Oh | G06F 12/0246 |
| 2020/0334166 A1* | 10/2020 | Byun | G06F 12/10 |
| 2020/0401331 A1* | 12/2020 | Mulani | G06F 12/1009 |
| 2021/0279180 A1 | 9/2021 | Um | |
| 2021/0311646 A1 | 10/2021 | Malladi et al. | |

(Continued)

FOREIGN PATENT DOCUMENTS

KR 10-2018-0054394 A 5/2018

*Primary Examiner* — Francisco A Grullon
(74) *Attorney, Agent, or Firm* — Sughrue Mion, PLLC

(57) ABSTRACT

A method of operating a computing system which includes a plurality of storage devices, a memory device, and a switch, is provided. The method includes: providing a first mapping request including first metadata corresponding to first user data to the memory device through the switch, by a first storage device of the plurality of storage devices; identifying a first standard corresponding to the first metadata based on the first mapping request, by the memory device; and generating first map data indicating a relationship between a first physical block address and a first logical block address of the first user data based on the first standard, by the memory device.

20 Claims, 19 Drawing Sheets

(56) References Cited

U.S. PATENT DOCUMENTS

2021/0311871 A1    10/2021   Malladi et al.
2021/0311895 A1    10/2021   Das Sharma
2021/0374056 A1*   12/2021   Malladi ............... G06F 12/0891
2022/0100687 A1*    3/2022   Sahin ..................... G06F 3/067

* cited by examiner

COMPUTING SYSTEM GENERATING MAP DATA, AND METHOD OF OPERATING THE SAME

CROSS-REFERENCE TO RELATED APPLICATION

This application claims priority under 35 U.S.C. § 119 to Korean Patent Application No. 10-2022-0056024 filed on May 6, 2022, in the Korean Intellectual Property Office, the disclosure of which is incorporated by reference herein in its entirety.

BACKGROUND

The present disclosure relates to a storage device, and more particularly, to a computing system generating map data, and a method of operating the same.

A memory device may store data in response to a write request and outputs data stored therein in response to a read request. For example, the memory device may be classified as a volatile memory device, which loses data stored therein when a power supply is interrupted, such as a dynamic random access memory (DRAM) device, a static RAM (SRAM) device, or a nonvolatile memory device, which retains data stored therein even when a power supply is interrupted, such as a flash memory device, a phase-change RAM (PRAM), a magnetic RAM (MRAM), or a resistive RAM (RRAM). The nonvolatile memory device may be used as a storage device storing a large amount of data.

A logical block address may be used in a host communicating with a storage device and a physical block address may be used for memory cells of the storage device. The logical block address and the physical block address are different from each other. The storage device may arbitrate the relationship between the logical block address and the physical block address by using map data.

As the capacity of storage devices continues to increase, the size of map data also increases. As such, there is a need for a technique for efficiently managing a large amount of map data.

SUMMARY

Example embodiments provide a computing system generating map data, and a method of operating the same.

According to an aspect of an example embodiment, A method of operating a computing system which includes a plurality of storage devices, a memory device, and a switch, is provided. The method includes: providing a first mapping request including first metadata corresponding to first user data to the memory device through the switch, by a first storage device of the plurality of storage devices; identifying a first standard corresponding to the first metadata based on the first mapping request, by the memory device; and generating first map data indicating a relationship between a first physical block address and a first logical block address of the first user data based on the first standard, by the memory device.

According to an aspect of an example embodiment, a method of operating a computing system which includes a plurality of storage devices, a memory device, and a switch, is provided. The method includes: providing a permission request to the memory device through the switch, by a target storage device of the plurality of storage devices; authorizing the target storage device to use the memory device based on the permission request, by the memory device; providing a mapping request including metadata corresponding to user data to the memory device through the switch, by the target storage device based on the target storage device being authorized; identifying a standard corresponding to the metadata based on the mapping request, by the memory device; and generating map data indicating a relationship between a logical address and a physical address of the user data based on the standard, by the memory device.

According to an aspect of an example embodiment, a computing system includes: a plurality of storage devices including a first storage device storing first user data; a memory device including a memory controller and a buffer memory; and a switch configured to provide an interface between the plurality of storage devices and the memory device. The memory controller is configured to: receive a first mapping request including first metadata corresponding to the first user data from the first storage device through the switch; identify a first standard corresponding to the first metadata based on the first mapping request; and generate first map data indicating a mapping relationship between a first physical block address and a first logical block address of the first user data based on the first standard.

BRIEF DESCRIPTION OF THE FIGURES

The above and other aspects and features of the present disclosure will be more clearly understood from the following description of example embodiments, taken in conjunction with the accompanying drawings, in which.

DETAILED DESCRIPTION

Below, example embodiments will be described with reference to the accompanying drawings.

Figure 1:
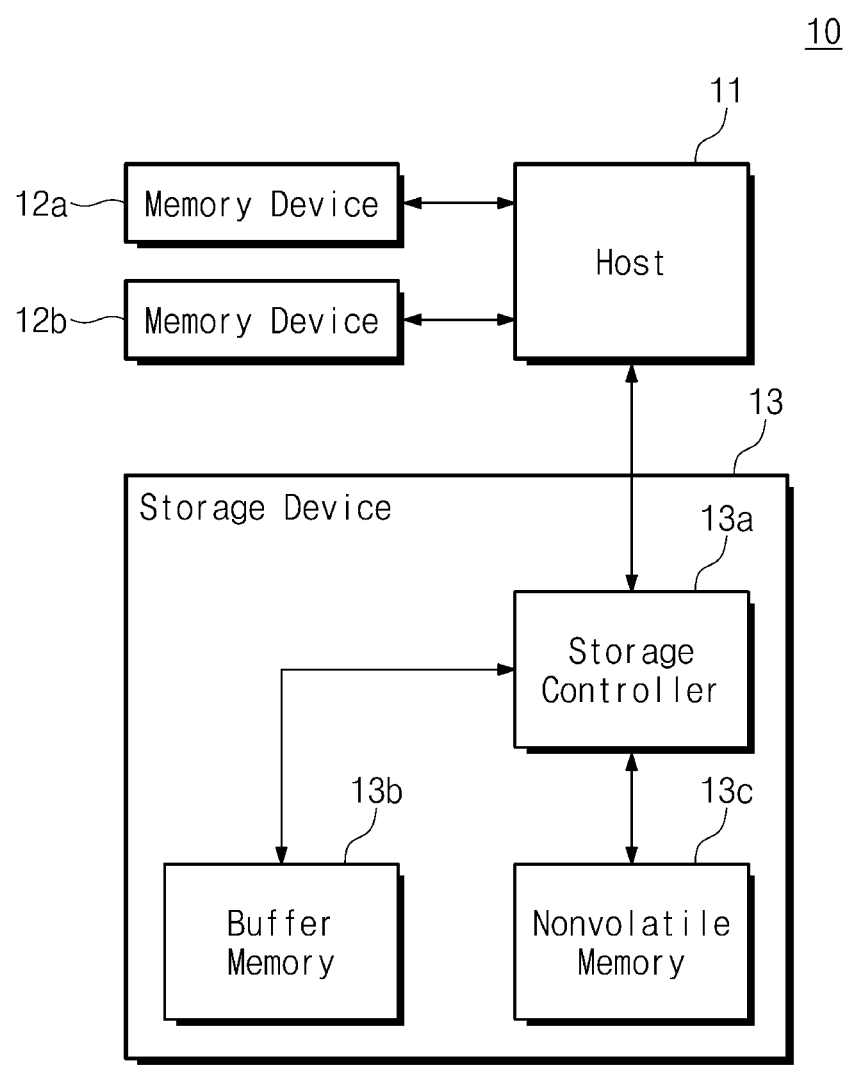
FIG. 1 is a block diagram of a computing system including a storage device.

FIG. 1 is a block diagram of a computing system including a storage device. Referring to FIG. 1, a computing system 10 may include a host 11, a plurality of memory devices 12a and 12b, and a storage device 13. The host 11 may control an overall operation of the computing system 10. The plurality of memory devices 12a and 12b may be used as a working memory or a system memory of the host 11.

The storage device 13 may include a storage controller 13a, a buffer memory 13b, and a nonvolatile memory 13c. Under control of the host 11, the storage controller 13a may store data in the nonvolatile memory 13c or may send data stored in the nonvolatile memory 13c to the host 11.

The buffer memory 13b may store a variety of information necessary for the storage device 13 to operate. For example, the storage controller 13a may manage data stored in the nonvolatile memory 13c by using map data. The map data may include information about a relationship between a logical block address managed by the host 11 and a physical block address of the nonvolatile memory 13c.

In an example embodiment, the buffer memory 13b may be a high-speed memory such as a DRAM. As the capacity of the nonvolatile memory 13c increases, the size of necessary map data may increase. However, because the capacity of the buffer memory 13b included in the single storage device 13 is limited, the buffer memory 13b may not be able to store the increased map data due that is needed due to the increase in the capacity of the nonvolatile memory 13c.

Figure 2:
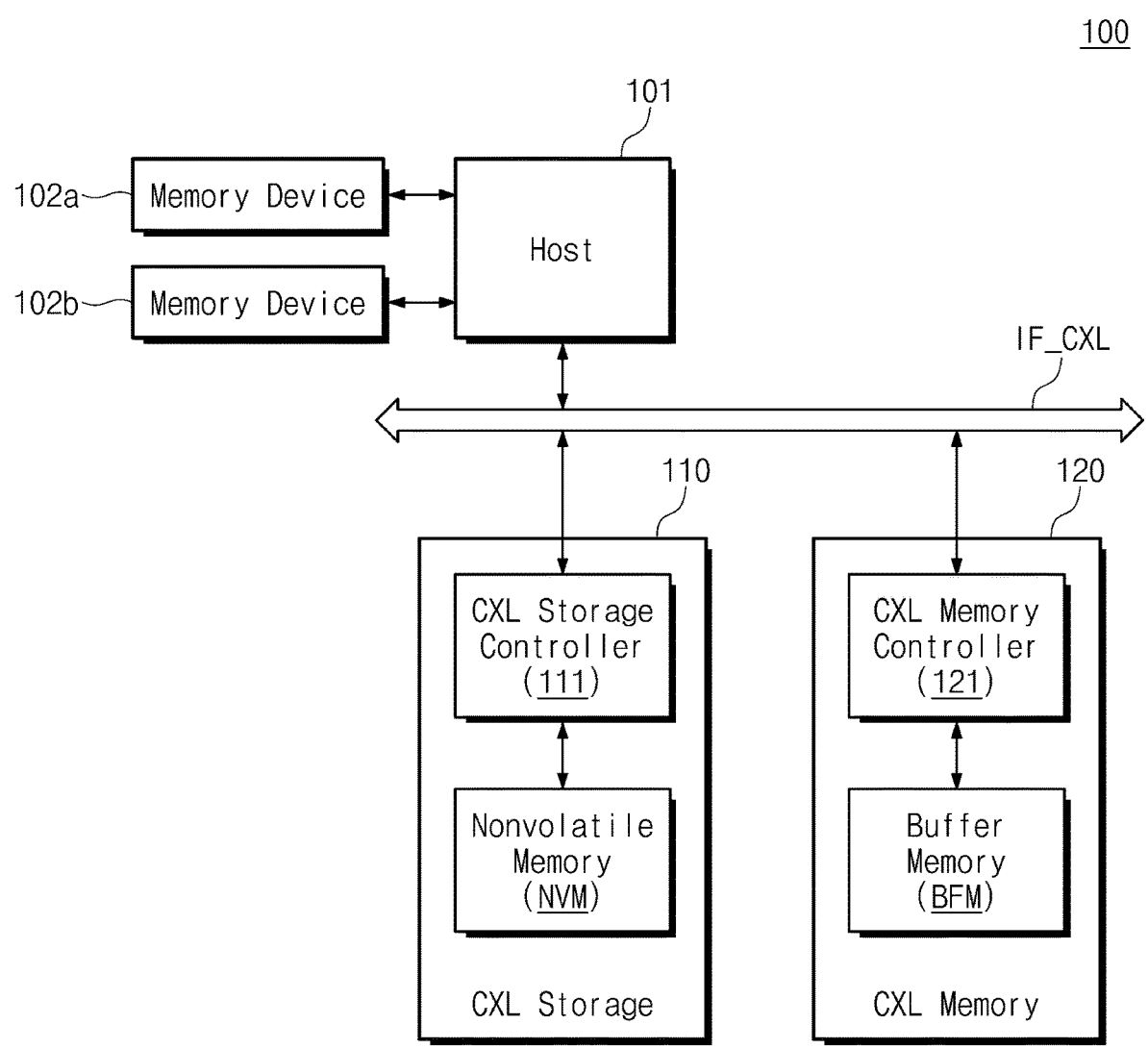
FIG. 2 is a block diagram of a computing system to which a storage device is applied, according to an example embodiment.

FIG. 2 is a block diagram of a computing system to which a storage device is applied, according to an example embodiment. Referring to FIG. 2, a computing system 100 may include a host 101, a plurality of memory devices 102a and 102b, Compute eXpress Link (CXL) storage 110, and a CXL memory 120. In an example embodiment, the computing system 100 may be included in user devices such as a personal computer, a laptop computer, a server, a media player, and a digital camera or automotive devices such as a navigation system, a black box, and an automotive electronic device/part. Alternatively, the computing system 100 may be a mobile system such as a mobile phone, a smartphone, a tablet personal computer (PC), a wearable device, a health care device, or an Internet of things (IoT) device.

The host 101 may control an overall operation of the computing system 100. In an example embodiment, the host 101 may be one of various processors such as a central processing unit (CPU), a graphics processing unit (GPU), a neural processing unit (NPU), and a data processing unit (DPU). In an example embodiment, the host 101 may include a single core processor or a multi-core processor.

The plurality of memory devices 102a and 102b may be used as a main memory or a system memory of the computing system 100. In an example embodiment, each of the plurality of memory devices 102a and 102b may be a dynamic random access memory (DRAM) device and may have the form factor of the dual in-line memory module (DIMM). However, example embodiments are not limited thereto. For example, the plurality of memory devices 102a and 102b may include a nonvolatile memory such as a flash memory, a phase change RAM (PRAM), a resistive RAM (RRAM), or a magnetic RAM (MRAM).

The plurality of memory devices 102a and 102b may each include an interface to directly communicate with the host 101, such as a Double Data Rate (DDR) interface. In an example embodiment, the host 101 may include a memory controller configured to control the plurality of memory devices 102a and 102b. However, example embodiments are not limited thereto. For example, the plurality of memory devices 102a and 102b may communicate with the host 101 through various interfaces.

The CXL storage 110 may include a CXL storage controller 111 and a nonvolatile memory NVM. Under control of the host 101, the CXL storage controller 111 may store data in the nonvolatile memory NVM or may send data stored in the nonvolatile memory NVM to the host 101. In an example embodiment, the nonvolatile memory NVM may be a NAND flash memory, but example embodiments are not limited thereto.

The CXL memory 120 may include a CXL memory controller 121 and a buffer memory BFM. Under control of the host 101, the CXL memory controller 121 may store data in the buffer memory BFM or may send data stored in the buffer memory BFM to the host 101. In an example embodiment, the buffer memory BFM may be a DRAM, but example embodiments are not limited thereto.

In an example embodiment, the host 101, the CXL storage 110, and the CXL memory 120 may be configured to share the same interface. For example, the host 101, the CXL storage 110, and the CXL memory 120 may communicate with each other through a CXL interface IF_CXL. In an example embodiment, the CXL interface IF_CXL may indicate a low-latency and high-bandwidth link that supports coherency, memory access, and dynamic protocol multiplexing of input and output protocols such that various connections between accelerators, memory devices, or various electronic devices are possible.

In an example embodiment, unlike the storage device 13 of FIG. 1, the CXL storage 110 may not include a separate buffer memory for storing or managing map data. In this case, the CXL storage 110 may require a buffer memory for storing or managing the map data. In an example embodiment, at least a partial area of the CXL memory 120 may be used as a buffer memory of the CXL storage 110. In this case, a mapping table that is managed by the CXL storage controller 111 of the CXL storage 110 may be stored in the CXL memory 120. For example, at least a partial area of the CXL memory 120 may be allocated for a buffer memory of the CXL storage 110 (i.e., for an area dedicated for the CXL storage 110) by the host 101.

In an example embodiment, the CXL storage 110 may access the CXL memory 120 through the CXL interface IF_CXL. For example, the CXL storage 110 may store the mapping table in the allocated area of the CXL memory 120 or may read the mapping table from the allocated area of the CXL memory 120. Under control of the CXL storage 110, the CXL memory 120 may store data (e.g., the map data) in the buffer memory BFM or may send the data (e.g., the map data) stored in the buffer memory BFM to the CXL storage 110.

As described with reference to FIG. 1, a related storage device 13 stores and manages the map data by using the buffer memory 13b included therein. As the capacity of the storage device 13 increases, the size of the map data increase, which necessitates an increase in the capacity of the buffer memory 13b included in the storage device 13.

However, there is a limitation on an increase in capacity due to the structure and physical characteristic of the buffer memory 13b included in the storage device 13.

In contrast, according to an example embodiment, the CXL storage 110 may use at least a partial area of the CXL memory 120 placed outside the CXL storage 110 as a buffer memory. In this case, because the CXL memory 120 is implemented independently of the CXL storage 110, the CXL memory 120 may be implemented with a high-capacity memory. As such, even though the size of the map data increases due to an increase in the capacity of the CXL storage 110, the map data may be normally managed by the CXL memory 120.

In an example embodiment, the storage controller 13a of the related storage device 13 communicate with the host 11 through the host interface such as Peripheral Component Interconnect Express (PCIe) or NVM Express (NVMe), and communicates with the buffer memory 13b through the memory interface such as a DDR interface or a Low-Power Double Data Rate (LPDDR) interface. That is, the storage controller 13a of the related storage device 13 communicates with the host 11 and the buffer memory 13b included therein, through different interfaces (i.e., heterogeneous interfaces).

In contrast, according to an example embodiment, the CXL storage controller 111 of the CXL storage 110 may communicate with both the host 101 and the CXL memory 120 (i.e., a buffer memory) through the CXL interface IF_CXL. In this regard, the CXL storage controller 111 of the CXL storage 110 may communicate with the host 101 and the CXL memory 120 through a homogeneous interface or a common interface and may use a partial area of the CXL memory 120 as a buffer memory.

Below, for convenience of description, it is assumed that the host 101, the CXL storage 110, and the CXL memory 120 communicate with each other through the CXL interface IF_CXL. However, example embodiments are not limited thereto. For example, the host 101, the CXL storage 110, and the CXL memory 120 may communicate with each other based on various computing interfaces complying with the following: GEN-Z protocol, NVLink protocol, Cache Coherent Interconnect for Accelerators (CCIX) protocol, and Open Coherent Accelerator Processor Interface (CAPI) protocol.

Figure 3:
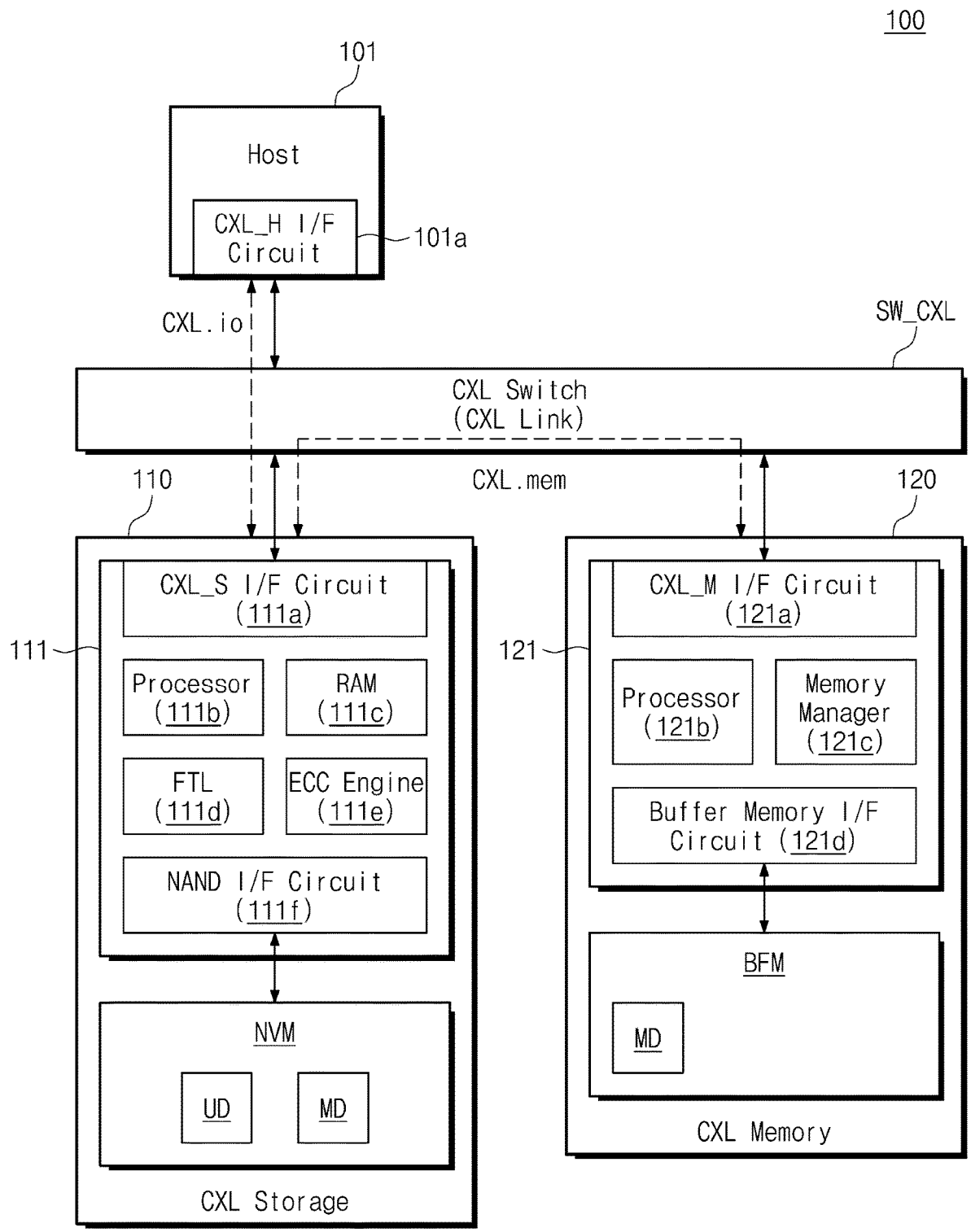
FIG. 3 is a block diagram illustrating a computing system of FIG. 2 in detail, according to an example embodiment.

FIG. 3 is a block diagram illustrating a computing system of FIG. 2 in detail, according to an example embodiment. Referring to FIGS. 2 and 3, the computing system 100 may include a CXL switch SW_CXL, the host 101, the CXL storage 110, and the CXL memory 120.

The CXL switch SW_CXL may be a component included in the CXL interface IF_CXL. The CXL switch SW_CXL may be configured to arbitrate the communication between the host 101, the CXL storage 110, and the CXL memory 120. For example, when the host 101 and the CXL storage 110 communicate with each other, the CXL switch SW_CXL may be configured to send information, which is provided from the host 101 or the CXL storage 110, such as a request, data, a response, or a signal to the CXL storage 110 or the host 101. When the host 101 and the CXL memory 120 communicate with each other, the CXL switch SW_CXL may be configured to send information, which is provided from the host 101 or the CXL memory 120, such as a request, data, a response, or a signal to the CXL memory 120 or the host 101. When the CXL storage 110 and the CXL memory 120 communicate with each other, the CXL switch SW_CXL may be configured to send information, which is provided from the CXL storage 110 or the CXL memory 120, such as a request, data, a response, or a signal to the CXL memory 120 or the CXL storage 110.

The host 101 may include a CXL host interface circuit 101a. The CXL host interface circuit 101a may communicate with the CXL storage 110 or the CXL memory 120 through the CXL switch SW_CXL.

In an example embodiment, a configuration of the CXL storage 110 may be different from configurations of related storages. For example, a related storage device (e.g., an SSD including a DRAM buffer) stores and manages map data in the DRAM buffer included in the related storage device. In this case, a high-capacity DRAM buffer for storing the map data may be included in the related storage device. Alternatively, another type of related storage device (e.g., a DRAM-less SSD or a DRAM-less memory card) may store the entire map data in a nonvolatile memory (e.g., a NAND flash memory) included in the related storage device, and the related storage device may load a portion of the map data onto an SRAM buffer. In this case, to load the map data, the nonvolatile memory, which has an operating speed lower than that of the DRAM buffer, is frequently accessed, thereby reducing the performance of operation.

In contrast, the CXL storage 110 according to example embodiments may not include a separate DRAM buffer configured to store the map data. In this case, map data MD may be stored and managed in the CXL memory 120 placed outside the CXL storage 110. As will be described below, because the CXL memory 120 supports a fast operating speed, the CXL storage 110 may have the same performance as the related storage device (e.g., a storage device including a DRAM). In addition, because the CXL memory 120 is placed outside the CXL storage 110, a large amount of map data of the CXL storage 110 may be managed.

The CXL storage 110 may include the CXL storage controller 111 and the nonvolatile memory NVM. The CXL storage controller 111 may include a CXL storage interface circuit 111a, a processor 111b, a RAM 111c, a flash translation layer (FTL) 111d, an error correction code (ECC) engine 111e, and a NAND interface circuit 111f.

The CXL storage interface circuit 111a may be connected with the CXL switch SW_CXL. The CXL storage interface circuit 111a may communicate with the host 101 or the CXL memory 120 through the CXL switch SW_CXL.

The processor 111b may be configured to control an overall operation of the CXL storage controller 111. The RAM 111c may be used as a working memory or a buffer memory of the CXL storage controller 111. In an example embodiment, the RAM 111c may be an SRAM, and may be used as a read buffer and a write buffer for the CXL storage 110. In an example embodiment, as will be described below, the RAM 111c may be configured to temporarily store the map data MD read from the CXL memory 120 or a portion of the map data MD.

The FTL 111d may perform various management operations for efficiently using the nonvolatile memory NVM. For example, the FTL 111d may perform address translation between a logical block address managed by the host 101 and a physical block address used in the nonvolatile memory NVM, based on map data (or a mapping table). The FTL 111d may perform a bad block management operation for the nonvolatile memory NVM. The FTL 111d may perform a wear leveling operation for the nonvolatile memory NVM. The FTL 111d may perform a garbage collection operation for the nonvolatile memory NVM.

In an example embodiment, the FTL 111d may be implemented in the form of hardware, firmware, or software, or in the form of a combination thereof. In the case where the FTL 111d is implemented in the form of firmware or software, program codes associated with the FTL 111d may be stored in the RAM 111c and may be driven by the processor 111b. In the case where the FTL 111d is implemented by hardware, hardware components configured to perform the above management operations may be implemented in the CXL storage controller 111.

The ECC engine 111e may perform error detection and correction on data read from the nonvolatile memory NVM. For example, the ECC engine 111e may generate parity bits for user data UD to be stored in the nonvolatile memory NVM, and the parity bits thus generated may be stored in the nonvolatile memory NVM together with the user data UD. When the user data UD are read from the nonvolatile memory NVM, the ECC engine 111e may detect and correct an error of the user data UD by using the parity bits read from the nonvolatile memory NVM together with the user data UD.

The NAND interface circuit 111f may control the nonvolatile memory NVM such that data are stored in the nonvolatile memory NVM or data are read from the nonvolatile memory NVM. In an example embodiment, the NAND interface circuit 111f may be implemented to comply with the standard protocol such as a toggle interface or Open NAND Flash Interface (ONFI). For example, the nonvolatile memory NVM may include a plurality of NAND flash devices; in the case where the NAND interface circuit 111f is implemented based on the toggle interface, the NAND interface circuit 111f may communicate with the plurality of NAND flash devices through a plurality of channels. The plurality of NAND flash devices may be connected with the plurality of channels through a multi-channel, multi-way structure.

The NAND interface circuit 111f may send a chip enable signal /CE, a command latch enable signal CLE, an address latch enable signal ALE, a read enable signal/RE and a write enable signal /WE to the plurality of NAND flash devices through the plurality of channels. The NAND interface circuit 111f and each NAND flash device may exchange a data signal DQ and a data strobe signal DQS through each channel.

TABLE 1

| /CE | CLE | ALE | /WE | /RE | DQS | DQx | MODE |
|-----|-----|-----|-----|-----|-----|-----|------|
| L | H | L | ↑ | H | X | CMD | Command Input |
| L | L | H | ↑ | H | X | ADDR | Address Input |
| L | L | L | H | H | ↑↓ | DATA_in | Data Input |
| L | L | L | H | ↑↓ | ↑↓ | DATA_out | Data Output |

Table 1 shows operating modes of a NAND flash device according to a state of each signal. Referring to Table 1, while the NAND flash device receives a command CMD or an address ADDR or receives/outputs data "DATA", the chip enable signal /CE maintains a low state "L". During a command input mode, the NAND interface circuit 111f may control signal lines such that the command latch enable signal CLE has a high level "H", the address latch enable signal ALE has the low level "L", the write enable signal /WE toggles between the high level "H" and the low level "L" and the read enable signal /RE has the high level "H". During the command input mode, the NAND interface circuit 111f may send the command CMD to the NAND flash device through data signals DQx in synchronization with the rising edge ↑ of the write enable signal /WE. The NAND flash device may identify the command CMD from the data signals DQx in response to the rising edge ↑ of the write enable signal /WE. During an address input mode, the NAND interface circuit 111f may control signal lines such that the command latch enable signal CLE has the low level "L", the address latch enable signal ALE has the high level "H", the write enable signal /WE toggles between the high level "H" and the low level "L", and the read enable signal /RE has the high level "H". During the address input mode, the NAND interface circuit 111f may send the address ADDR to the NAND flash device through the data signals DQx in synchronization with the rising edge ↑ of the write enable signal /WE. The NAND flash device may identify the address ADDR from the data signals DQx in response to the rising edge ↑ of the write enable signal /WE. In an example embodiment, the address ADDR may be a value corresponding to a physical block address of the NAND flash device.

During a data input mode, the NAND interface circuit 111f may control signal lines such that the command latch enable signal CLE has the low level "L", the address latch enable signal ALE has the low level "L", the write enable signal /WE has the high level "H", the read enable signal /RE has the high level "H", and the data strobe signal DQS toggles between the high level "H" and the low level "L". During the data input mode, the NAND interface circuit 111f may send the data "DATA" to the NAND flash device through the data signals DQx in synchronization with the rising edge ↑ and the falling edge ↓ of the data strobe signal DQS. The NAND flash device may identify the data "DATA" from the data signals DQx in response to the rising edge ↑ and the falling edge ↓ of the data strobe signal DQS.

During a data output mode, the NAND interface circuit 111f may control signal lines that the command latch enable signal CLE has the low level "L", the address latch enable signal ALE has the low level "L", the write enable signal /WE has the high level "H", and the read enable signal /RE toggles between the high level "H" and the low level "L". During the data output mode, the NAND flash device may generate the data strobe signal DQS toggling between the high level "H" and the low level "L" in response to the read enable signal /RE. The NAND flash device may send the data "DATA" to the NAND interface circuit 111f through the data signals DQx in synchronization with the rising edge ↑ and the falling edge ↓ of the data strobe signal DQS. The NAND interface circuit 111f may identify the data "DATA" from the data signals DQx in response to the rising edge ↑ and the falling edge ↓ of the data strobe signal DQS.

The toggle interface described above is an example, and example embodiments are not limited thereto.

The nonvolatile memory NVM may store or output the user data UD under control of the CXL storage controller 111. The nonvolatile memory NVM may store or output the map data MD under control of the CXL storage controller 111. In an example embodiment, the map data MD stored in the nonvolatile memory NVM may include mapping information corresponding to the entire user data UD stored in the nonvolatile memory NVM. The map data MD stored in the nonvolatile memory NVM may be stored in the CXL memory 120 in the initialization operation of the CXL storage 110.

The CXL memory 120 may include the CXL memory controller 121 and the buffer memory BFM. The CXL memory controller 121 may include a CXL memory interface circuit 121a, a processor 121b, a memory manager 121c, and a buffer memory interface circuit 121d.

The CXL memory interface circuit 121a may be connected with the CXL switch SW_CXL. The CXL memory interface circuit 121a may communicate with the host 101 or the CXL storage 110 through the CXL switch SW_CXL.

The processor 121b may be configured to control an overall operation of the CXL memory controller 121. The memory manager 121c may be configured to manage the buffer memory BFM. For example, the memory manager 121c may be configured to translate a memory address (e.g., a logical address or a virtual address) from the host 101 or the CXL storage 110 into a physical address for the buffer memory BFM. In an example embodiment, the memory address that is an address for managing a storage area of the CXL memory 120 may be a logical address or a virtual address that is designated and managed by the host 101.

The buffer memory interface circuit 121d may control the buffer memory BFM such that data are stored in the buffer memory BFM or data are read from the buffer memory BFM. In an example embodiment, the buffer memory interface circuit 121d may be implemented to comply with the standard protocol such as a DDR interface or an LPDDR interface.

Under control of the CXL memory controller 121, the buffer memory BFM may store data or may output the stored data. In an example embodiment, the buffer memory BFM may be configured to store the map data MD that are used in the CXL storage 110. The map data MD may be transferred from the CXL storage 110 to the CXL memory 120 when the computing system 100 is initialized or the CXL storage 110 is initialized.

As described above, the CXL storage 110 according to an example embodiment may store the map data MD, which are necessary to manage the nonvolatile memory NVM, in the CXL memory 120 connected through the CXL switch SW_CXL (or the CXL interface IF_CXL). Afterwards, when the CXL storage 110 performs the read operation according to a request of the host 101, the CXL storage 110 may read at least a portion of the map data MD from the CXL memory 120 through the CXL switch SW_CXL (or the CXL interface IF_CXL) and may perform the read operation based on the map data MD thus read. Alternatively, when the CXL storage 110 performs the write operation according to a request of the host 101, the CXL storage 110 may perform the write operation on the nonvolatile memory NVM and may update the map data MD. In this case, the updated map data MD may be first stored in the RAM 111c of the CXL storage controller 111, and the map data MD stored in the RAM 111c may be transferred to the buffer memory BFM of the CXL memory 120 through the CXL switch SW_CXL (or the CXL interface IF_CXL), so as to be updated in the buffer memory BFM.

In an example embodiment, at least a partial area of the buffer memory BFM of the CXL memory 120 may be allocated for a dedicated area for the CXL storage 110, and the remaining area may be used as an area that is capable of being accessed by the host 101.

In an example embodiment, the host 101 and the CXL storage 110 may communicate with each other by using an input/output protocol, such as CXL.io. The CXL.io may be a PCIe-based non-coherency input/output protocol. The host 101 and the CXL storage 110 may exchange user data or variety of information with each other by using the CXL.io.

In an example embodiment, the CXL storage 110 and the CXL memory 120 may communicate with each other by using a memory access protocol, such as CXL.mem. The CXL.mem may be a memory access protocol that supports memory access. The CXL storage 110 may access a partial area (e.g., an area where the map data MD are stored or a CXL storage-dedicated area) of the CXL memory 120 by using the CXL.mem.

In an example embodiment, the host 101 and the CXL memory 120 may communicate with each other by using CXL.mem. The host 101 may access, as a system memory, the remaining area (e.g., the remaining area other than the area where the map data MD are stored or the remaining area other than the CXL storage-dedicated area) of the CXL memory 120 by using the CXL.mem.

The above access types including CXL.io and CXL.mem are provided as an example, and example embodiments are not limited thereto.

In an example embodiment, the CXL storage 110 and the CXL memory 120 may be installed in a CXL interface-based physical port (e.g., a PCIe physical port). In an example embodiment, the CXL storage 110 and the CXL memory 120 may be implemented based on the E1.S, E1.L, E3.S, E3.L, or PCIe AIC (CEM) form factor. Alternatively, the CXL storage 110 and the CXL memory 120 may be implemented based on the U.2 form factor, the M.2 form factor, various different types of PCIe-based form factors, or various different types of small form factors. As will be described with reference to FIG. 14, the CXL storage 110 and the CXL memory 120 may be implemented with various types of form factors, and may support a function of a hot-plug capable of being installed in or removed from the physical port.

Figure 4:
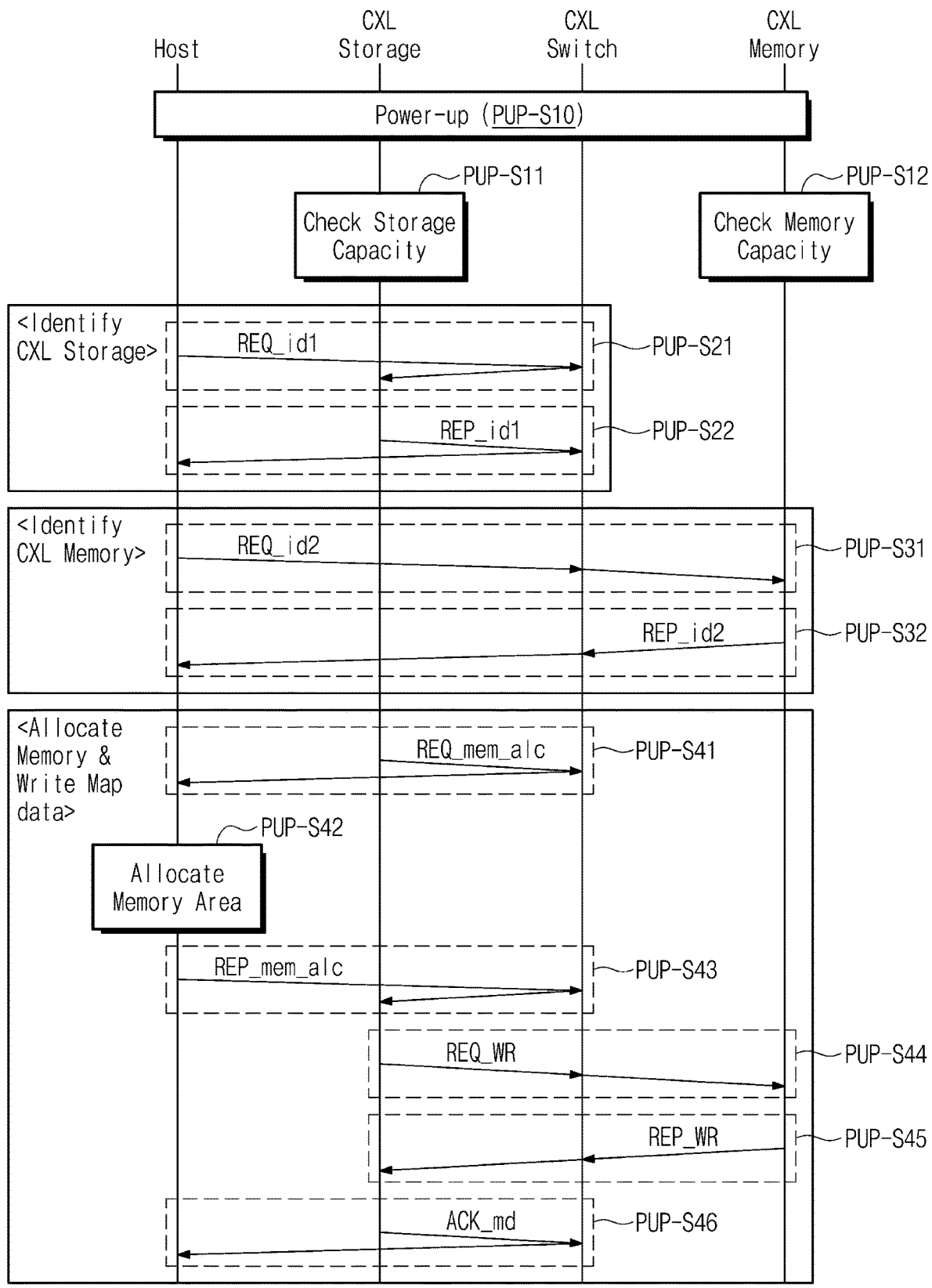
FIG. 4 is a flowchart illustrating an initialization operation or a power-up operation of a computing system of FIG. 3, according to an example embodiment.

FIG. 4 is a flowchart illustrating an initialization operation or a power-up operation of a computing system of FIG. 3, according to an example embodiment. Referring to FIGS. 3 and 4, in operation PUP-S10, the computing system 100 may be powered up. When the computing system 100 is powered up, the host 101 may send information about power-up or initialization start to the CXL storage 110, the CXL switch SW_CXL, and the CXL memory 120. In response to the information about power-up or initialization start, each of the CXL storage 110, the CXL switch SW_CXL, and the CXL memory 120 may perform an individual initialization operation.

In operation PUP-S11, the CXL storage 110 may check a storage capacity (i.e., a capacity of the nonvolatile memory NVM). For example, the CXL storage 110 may check the storage capacity of the nonvolatile memory NVM in response to the information about power-up or initialization start.

In operation PUP-S12, the CXL memory 120 may check a memory capacity (i.e., a capacity of the buffer memory BFM). For example, the CXL memory 120 may check the capacity of the buffer memory BFM in response to the information about power-up or initialization start.

The host 101 may recognize information of the CXL storage 110 through operation PUP-S21 and operation PUP-S22. For example, in operation PUP-S21, the host 101 may issue a first device information request REQ_id1 for recognizing device information of the CXL storage 110 through the CXL host interface circuit 101a. The first device information request REQ_id1 may be transferred to the CXL switch SW_CXL. The CXL switch SW_CXL may transfer the first device information request REQ_id1 to the CXL storage 110 targeted for the first device information request REQ_id1.

In operation PUP-522, the CXL storage 110 may output a first device information response REP_id1 through the CXL storage interface circuit 111a in response to the first device information request REQ_id1 received from the CXL switch SW_CXL. The first device information response REP_id1 may be transferred to the CXL switch SW_CXL. The CXL switch SW_CXL may transfer the first device information response REP_id1 to the host 101 targeted for the first device information response REP_id1.

The host 101 may identify the device information of the CXL storage 110 in response to the first device information response REP_id1 received from the CXL switch SW_CXL. In an example embodiment, the first device information response REP_id1 may include information about a device type and a storage capacity of the CXL storage 110.

The host 101 may recognize information of the CXL memory 120 through operation PUP-S31 and operation PUP-532. For example, in operation PUP-531, the host 101 may issue a second device information request REQ_id2 for recognizing device information of the CXL memory 120 through the CXL host interface circuit 101a. The second device information request REQ_id2 may be transferred to the CXL switch SW_CXL. The CXL switch SW_CXL may transfer the second device information request REQ_id2 to the CXL memory 120 targeted for the second device information request REQ_id2.

In operation PUP-S32, the CXL memory 120 may output a second device information response REP_id2 through the CXL memory interface circuit 121a in response to the second device information request REQ_id2 received from the CXL switch SW_CXL. The second device information response REP_id2 may be transferred to the CXL switch SW_CXL. The CXL switch SW_CXL may transfer the second device information response REP_id2 to the host 101 targeted for the second device information response REP_id2.

The host 101 may identify the device information of the CXL memory 120 in response to the second device information response REP_id2 received from the CXL switch SW_CXL. In an example embodiment, the second device information response REP_id2 may include information about a device type and a storage capacity of the CXL memory 120.

As described above, the host 101 may identify the information about the device types (e.g., a storage type or a memory type) and capacities of the CXL storage 110 and the CXL memory 120 through operation PUP-S21 to operation PUP-S32.

The host 101 may allocate at least a partial area of the CXL memory 120 for an area dedicated for the CXL storage 110 through operation PUP-S41 to operation PUP-S46. For example, in operation PUP-S41, the CXL storage 110 may output a memory allocation request REQ_mem_alc through the CXL storage interface circuit 111a. The memory allocation request REQ_mem_alc may be transferred to the CXL switch SW_CXL. The CXL switch SW_CXL may transfer the memory allocation request REQ_mem_alc to the host 101. In an example embodiment, the memory allocation request REQ_mem_alc may refer to an allocation request for an area, which is to be used as a dedicated area of the CXL storage 110, from among areas of the CXL memory 120.

In operation PUP-S42, the host 101 may allocate at least a partial area of the CXL memory 120 for the dedicated area of the CXL storage 110 in response to the memory allocation request REQ_mem_alc. For example, the host 101 may determine a buffer capacity required by the CXL storage 110 based on the storage capacity of the CXL storage 110. The host 101 may allocate the area of the CXL memory 120, which corresponds to the determined buffer capacity, for the dedicated area of the CXL storage 110.

In operation PUP-S43, the host 101 may output a memory allocation response REP_mem_alc through the CXL host interface circuit 101a. The memory allocation response REP_mem_alc may be transferred to the CXL switch SW_CXL. The CXL switch SW_CXL may transfer the memory allocation response REP_mem_alc to the CXL storage 110 targeted for the memory allocation response REP_mem_alc. In an example embodiment, the memory allocation response REP_mem_alc may include information about a device identifier of the CXL memory 120 and a memory address (e.g., a logical address range or a virtual address range) of an area of the CXL memory 120, which is allocated for a dedicated area of the CXL memory 120.

The CXL storage 110 may identify the area of the CXL memory 120, which is dedicated for the CXL storage 110, based on the memory allocation response REP_mem_alc.

In operation PUP-S44, the CXL storage 110 may output a write request REQ_WR through the CXL storage interface circuit 111a. The write request REQ_WR may be transferred to the CXL switch SW_CXL. The CXL switch SW_CXL may transfer the write request REQ_WR to the CXL memory 120 targeted for the write request REQ_WR. The CXL memory 120 may perform the write operation in response to the write request REQ_WR. In an example embodiment, the CXL memory 120 may perform the write operation on the map data MD dynamically. This will be described in detail with reference to FIGS. 17 to 19.

In operation PUP-545, the CXL memory 120 may output, through the CXL memory interface circuit 121a, a write response REP_WR providing notification that the write request is completed. The CXL switch SW_CXL may transfer the write response REP_WR to the CXL storage 110 targeted for the write response REP_WR. The CXL storage 110 may recognize that the write operation is completely performed on the CXL memory 120, in response to the write response REP_WR.

In an example embodiment, the write request REQ_WR may refer to a request for storing the map data MD present in the nonvolatile memory NVM of the CXL storage 110 in the dedicated area of the CXL memory 120. That is, the write request REQ_WR may include address information about the map data MD and the dedicated area. Through operation PUP-S44 and operation PUP-545, the map data MD present in the CXL storage 110 may be stored in the dedicated area of the CXL memory 120.

In operation PUP-546, the CXL storage 110 may output acknowledge information ACK_md through the CXL storage interface circuit 111a. The CXL switch SW_CXL may transfer the acknowledge information ACK_md to the host 101. In response to the acknowledge information ACK_md, the host 101 may recognize that the CXL storage 110 stores the map data MD in the CXL memory 120. Afterwards, the host 101, the CXL storage 110, and the CXL memory 120 may perform a normal operation (e.g., a read operation or a write operation).

Figure 5:
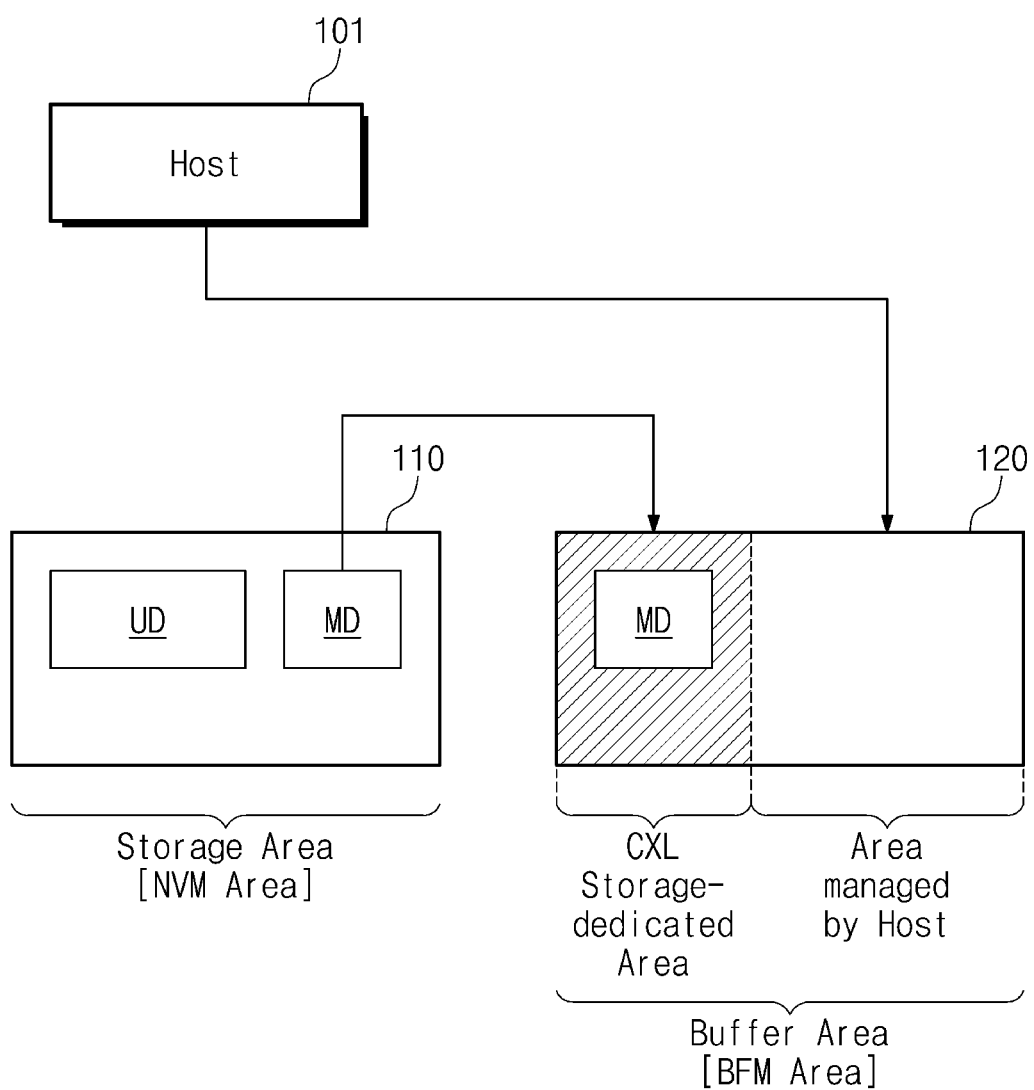
FIG. 5 is a diagram describing an operation in which a computing system stores map data, according to an example embodiment.

FIG. 5 is a diagram describing an operation in which the computing system 100 stores map data, according to an example embodiment. For convenience of description and for brevity of drawing, components of the host 101, the CXL storage 110, and the CXL memory 120 are conceptually illustrated, and some components are omitted.

Referring to FIGS. 3 to 5, the host 101 may allocate a partial area of the CXL memory 120 for a dedicated area of the CXL storage 110. In this case, the dedicated area of the CXL memory 120 may be accessed by the CXL storage 110 and may be used to store map data of the CXL storage 110.

For example, as illustrated in FIG. 5, the nonvolatile memory NVM of the CXL storage 110 may store the user data UD and the map data MD. As described above, because the CXL storage 110 does not include a separate buffer memory, the CXL storage 110 may require a buffer area in which the map data MD are to be stored. According to an example embodiment, the map data MD of the CXL storage 110 may be stored in a partial area (e.g., a dedicated area allocated by the host 101) of the CXL memory 120. In this case, the dedicated area of the CXL memory 120 may be accessed by the CXL storage 110 through the CXL switch SW_CXL. The host 101 may variably allocate a dedicated area of the CXL memory 120 so that a size of the dedicated area varies according to the map data MD to be generated.

In an example embodiment, the remaining area of the CXL memory 120, which is not allocated, other than the dedicated area, may be an area that is accessible by the host 101 or is managed by the host 101. In this case, the host 101 may access the remaining area of the CXL memory 120 through the CXL switch SW_CXL. In an example embodiment, the remaining area of the CXL memory 120, which is not allocated for the dedicated area, may be used as a memory expander.

As described above, depending on the request of the CXL storage 110, the host 101 may allocate at least a partial area of the CXL memory 120 for the dedicated area of the CXL storage 110. In this case, the CXL storage 110 may access a portion of the CXL memory 120, which is allocated for the dedicated area, and the host 101 may access the remaining area of the CXL memory 120 (i.e., the remaining area other than the dedicated area thus allocated). In an example embodiment, both the access of the CXL storage 110 to the CXL memory 120 and the access of the host 101 to the CXL memory 120 may be performed through the same interface (e.g., a CXL interface or a CXL switch).

In an example embodiment, when the system memory of the host 101 is insufficient, the host 101 may retrieve (or recover) a portion of the dedicated area of the CXL memory 120, which is allocated to the CXL storage 110 (i.e., an area for storing map data). The retrieved (or recovered) portion of the dedicated area may be used as the system memory by the host 101.

Figure 6:
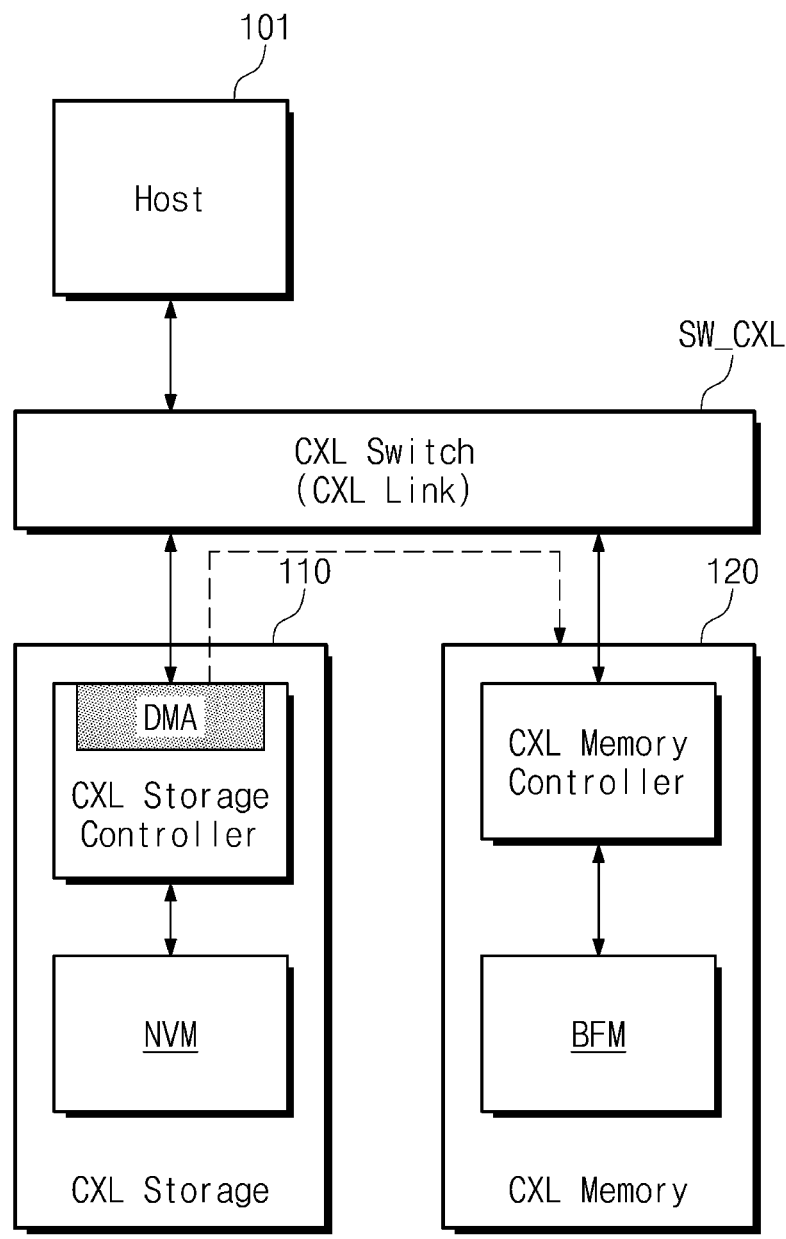
FIGS. 6 and 7 are diagrams describing an operation in which map data are stored in a CXL memory, according to an example embodiment.
Figure 7:
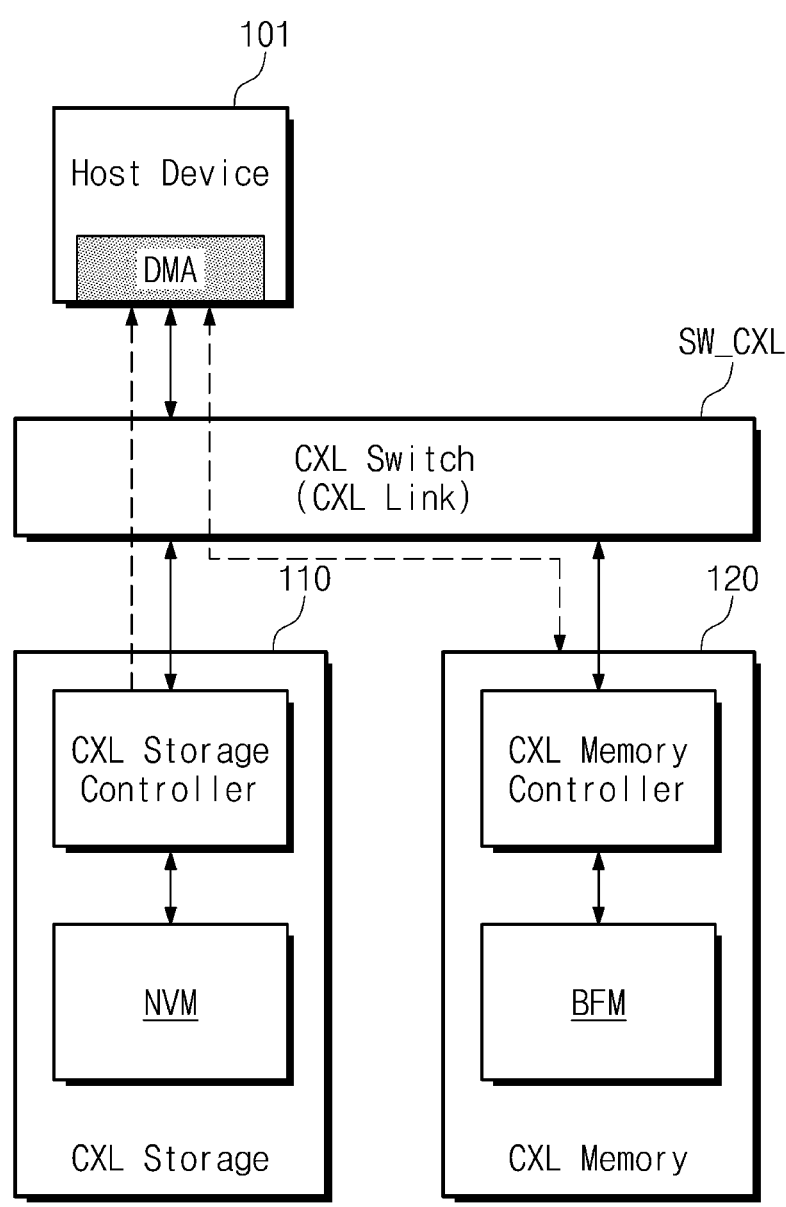

FIGS. 6 and 7 are diagrams describing an operation in which map data are stored in a CXL memory, according to an example embodiment. In an example embodiment, the map data MD present in the CXL storage 110 may be transferred to and stored in the CXL memory 120 from the CXL storage 110 through various manners.

As an example, the CXL storage 110 and the CXL memory 120 may exchange the map data MD based on a peer-to-peer (P2P) manner. For example, as illustrated in FIG. 6, the CXL storage controller 111 of the CXL storage 110 may include a direct memory access (DMA) engine. The DMA engine included in the CXL storage controller 111 may transfer the map data MD present in the nonvolatile memory NVM to the CXL memory 120 without the interference or control of the host 101. That is, the map data MD may be transferred from the CXL storage 110 to the CXL memory 120 based on the P2P manner.

As an example, under control of the host 101, the CXL storage 110 and the CXL memory 120 may exchange the map data MD based on the DMA manner. For example, as illustrated in FIG. 7, the host 101 may include a DMA engine. The DMA engine of the host 101 may read the map data MD from the CXL storage 110 and may transfer the map data MD thus read to the CXL memory 120. In an example embodiment, the DMA engine of the host 101 may read the map data MD from the CXL storage 110 based on the CXL.io and may transfer the map data MD to the CXL memory 120 based on the CXL.mem.

The above manners in which map data are transferred from the CXL storage 110 to the CXL memory 120 are provided as examples, and example embodiments are not limited thereto. It may be understood that the transfer of map data from the CXL storage 110 to the CXL memory 120 may be implemented in various manners using the CXL interface or the CXL switch. In an example embodiment, the transfer (i.e., the backup or flush) of map data from the CXL memory 120 to the CXL storage 110 may also be implemented in a manner(s) similar to the above manners.

Figure 8:
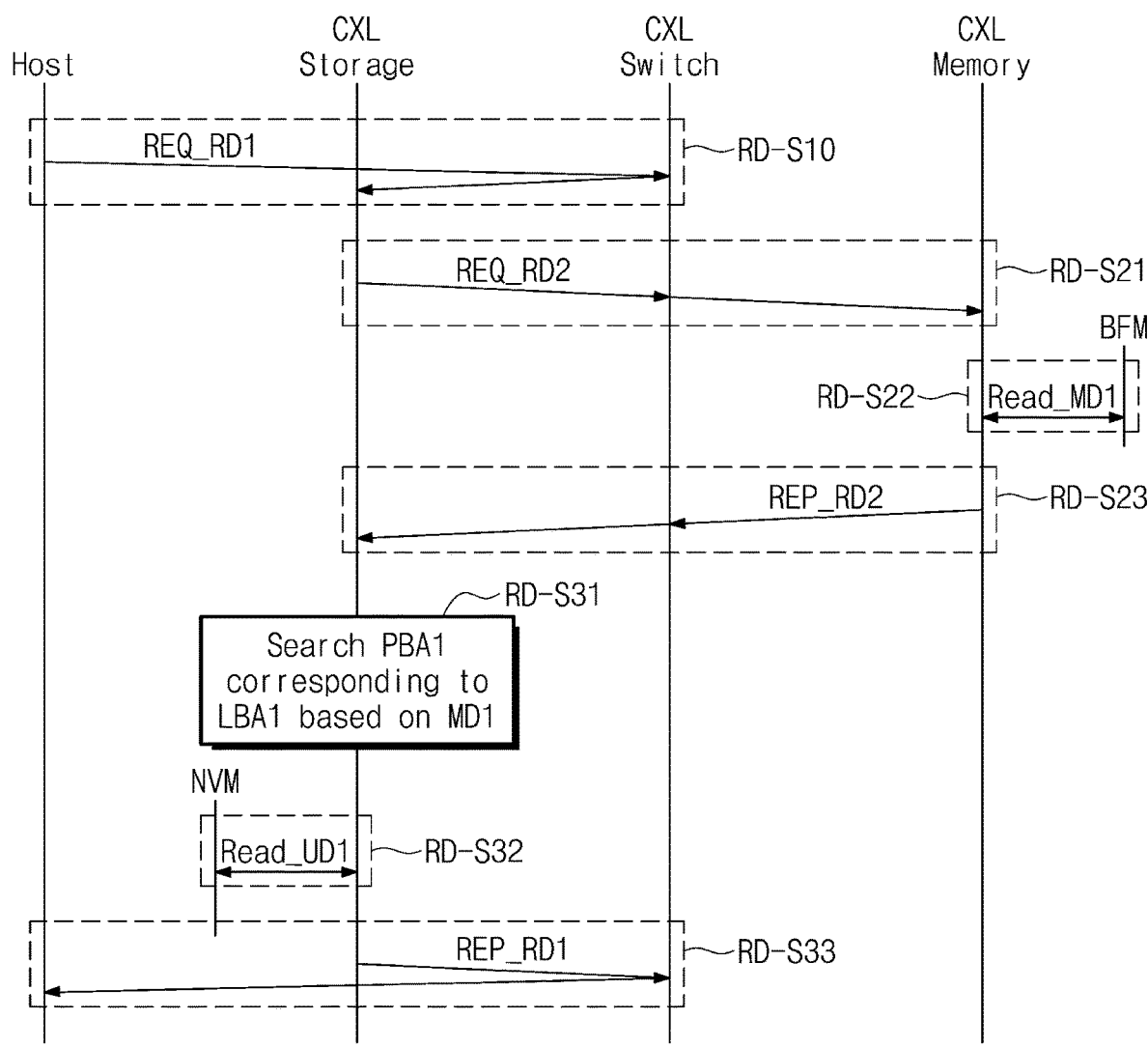
FIG. 8 is a flowchart illustrating a read operation for a CXL storage, according to an example embodiment.

FIG. 8 is a flowchart illustrating a read operation for a CXL storage, such as the CXL storage 110, according to an example embodiment. In an example embodiment, the read operation for the CXL storage 110 according to the flowchart of FIG. 8 may be performed after the initialization operation of FIG. 4 is performed (i.e., after the map data MD of the CXL storage 110 are stored in the dedicated area of the CXL memory 120).

Referring to FIGS. 2, 3, and 8, in operation RD-S10, the host 101 may output a first read request REQ_RD1 through the CXL host interface circuit 101a. The CXL switch SW_CXL may transfer the first read request REQ_RD1 to the CXL storage 110 targeted for the first read request REQ_RD1. In an example embodiment, the first read request REQ_RD1 may refer to a request for reading first user data UD1 stored in the CXL storage 110 and may include a first logical block address LBA1 corresponding to the first user data UD1.

In operation RD-521, the CXL storage 110 may output a second read request REQ_RD2 through the CXL storage interface circuit 111a in response to the first read request REQ_RD1. The CXL switch SW_CXL may transfer the second read request REQ_RD2 to the CXL memory 120. In an example embodiment, the second read request REQ_RD2 may refer to a request for reading first map data MD1 corresponding to the first logical block address LBA1. That is, the second read request REQ_RD2 may refer to a request for reading the first map data MD1 from the CXL memory 120. The second read request REQ_RD2 may include information about a memory address (e.g., a logical address or a virtual address) of the CXL memory 120, which indicates an area where the first map data MD1 are stored. In an example embodiment, the first map data MD1 may be data dynamically allocated to the buffer memory BFM in the initialization operation or write operation before operation RD-S10.

In operation RD-522, the CXL memory 120 may read the first map data MD1 in response to the second read request REQ_RD2. For example, the CXL memory controller 121 of the CXL memory 120 may read the first map data MD1 from an area corresponding to a memory address (e.g., a logical address or a virtual address) included in the second read request REQ_RD2. In an example embodiment, the CXL memory controller 121 may read the first map data MD1 from the buffer memory BFM by using the buffer memory interface circuit 121d.

In an example embodiment, the first map data MD1 read in operation RD-S22 may be a portion of the entire map data MD and may be map data corresponding to the first logical block address LBA1. That is, the first map data MD1 may include information about a first physical block address PBA1 corresponding to the first logical block address LBA1.

In operation RD-523, the CXL memory 120 may output the second read response REP_RD2 including the first map data MD1 through the CXL memory interface circuit 121a. The CXL switch SW_CXL may transfer a second read response REP_RD2 to the CXL storage 110. In an example embodiment, the first map data MD1 included in the second read response REP_RD2 received through the CXL switch SW_CXL may be stored or temporarily stored in the RAM 111c of the CXL storage controller 111.

In an example embodiment, when the first map data MD1 corresponding to the first logical block address LBA1 is already present in the RAM 111c of the CXL storage controller 111, operation RD-S21 to operation RD-S23 (i.e., operations for loading the first map data MD1 from the CXL memory 120) may be omitted.

In operation RD-S31, the CXL storage 110 may search for the first physical block address PBA1 corresponding the first logical block address LBA1 based on the first map data MD1. For example, the FTL 111d of the CXL storage controller 111 may search for the first physical block address PBA1 corresponding to the first logical block address LBA1 based on the first map data MD1.

In operation RD-S32, the CXL storage 110 may read the first user data UD1 present in an area corresponding to the first physical block address PBA1 from the nonvolatile memory NVM. For example, the CXL storage controller 111 may read the first user data UD1 from the area of the nonvolatile memory NVM, which corresponds to the first physical block address PBA1. In an example embodiment, the CXL storage controller 111 may read the first user data UD1 from the nonvolatile memory NVM by using the NAND interface circuit 111f.

In operation RD-S33, the CXL storage 110 may output a first read response REP_RD1 to the first read request REQ_RD1 through the CXL storage interface circuit 111a. The CXL switch SW_CXL may transfer the first read response REP_RD1 to the host 101. In an example embodiment, the first read response REP_RD1 may include the first user data UD1 requested through the first read request REQ_RD1. The host 101 may obtain the first user data UD1 through the first read response REP_RD1.

In an example embodiment, operation RD-S10 and operation RD-S33 corresponding to the communications between the host 101 and the CXL storage 110 may be performed based on the CXL.io, and operation RD-S21 and operation RD-S23 corresponding to the communications between the CXL storage 110 and the CXL memory 120 may be performed based on the CXL.mem. However, example embodiments are not limited thereto. For example, the communications between the host 101, the CXL storage 110, and the CXL memory 120 may be performed through the CXL switch SW_CXL (i.e., a common interface, a common link, or a common switch).

Figure 9:
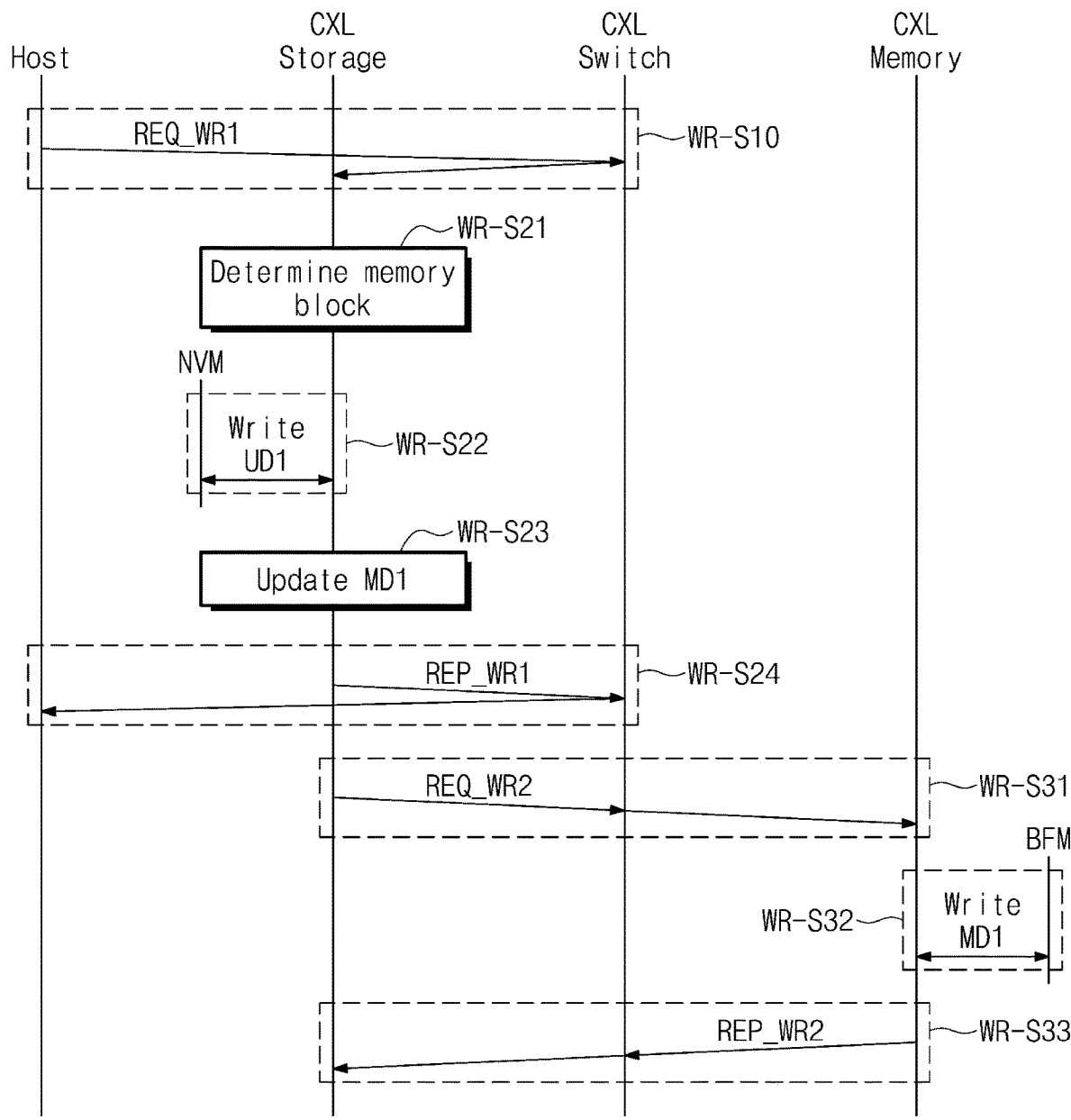
FIG. 9 is a flowchart illustrating a write operation for a CXL storage, according to an example embodiment.

FIG. 9 is a flowchart illustrating a write operation for a CXL storage, such as the CXL storage 110, according to an example embodiment. In an example embodiment, the write operation for the CXL storage 110 according to the flowchart of FIG. 9 may be performed after the initialization operation of FIG. 4 is performed (i.e., after the map data MD of the CXL storage 110 are stored in the dedicated area of the CXL memory 120).

Referring to FIGS. 2, 3, and 9, in operation WR-S10, the host 101 may output a first write request REQ_WR1 through the CXL host interface circuit 101a. The CXL switch SW_CXL may transfer the first write request REQ_WR1 to the CXL storage 110. In an example embodiment, the first write request REQ_WR1 may refer to a request for writing the first user data UD1 in the CXL storage 110.

In operation WR-S21, the CXL storage 110 may determine a memory block in which the first user data UD1 are to be written, in response to the first write request REQ_WR1. For example, the FTL 111d of the CXL storage controller 111 may manage block information about a memory block, which is free, capable of being written, or capable of being allocated, from among memory blocks included in the nonvolatile memory NVM. The FTL 111d may select a memory block, in which the first user data UD1 are to be written, based on the block information.

In operation WR-522, the CXL storage 110 may write the first user data UD1 in the selected memory block. For example, the CXL storage controller 111 may control the nonvolatile memory NVM such that the first user data UD1 are written in the selected memory block. In an example embodiment, the CXL storage controller 111 may write the first user data UD1 in the nonvolatile memory NVM by using the NAND interface circuit 111f.

When the first user data UD1 are completely written in the nonvolatile memory NVM (i.e., when a program operation for the nonvolatile memory NVM is passed), in operation WR-S23, the CXL storage 110 may update the first map data MD1 or may generate the first map data MD1. For example, the first map data MD1 may include information indicating that the first user data UD1 corresponding to the first logical block address LBA1 are stored in an area of the nonvolatile memory NVM, which corresponds to the first physical block address PBA1. That is, the CXL storage 110 may generate the first map data MD1 indicating that the first user data UD1 corresponding to the first logical block address LBA1 are stored in the area corresponding to the first physical block address PBA1.

In operation WR-S24, the CXL storage 110 may output a first write response REP_WR1 to the first write request REQ_WR1 through the CXL storage interface circuit 111a. The CXL switch SW_CXL may transfer the first write response REP_WR1 to the host 101. In response to the first write response REP_WR1, the host 101 may determine that the first user data UD1 corresponding to the first write request REQ_WR1 are normally stored in the CXL storage 110.

After the write operation for the CXL storage 110 requested by the host 101 is completed, the CXL storage 110 may perform a map data update operation. For example, in operation WR-S31, the CXL storage 110 may output a second write request REQ_WR2 through the CXL storage interface circuit 111a. The CXL switch SW_CXL may transfer the second write request REQ_WR2 to the CXL memory 120.

In an example embodiment, the second write request REQ_WR2 may refer to a request for writing the first map data MD1, which are updated or generated as the first user data UD1 are stored, in the CXL memory 120. The second write request REQ_WR2 may include a memory address at which the first map data MD1 are to be stored. The memory address included in the second write request REQ_WR2 may indicate the area of the CXL memory 120, which is dedicated for the CXL storage 110.

In operation WR-S32, the CXL memory 120 may store the first map data MD1 in the corresponding area in response to the second write request REQ_WR2. For example, the CXL memory 120 may write the first map data MD1 in the area corresponding to the memory address included in the second write request REQ_WR2. In an example embodiment, the CXL memory 120 may perform the write operation on the map data MD dynamically. This will be described in detail with reference to FIGS. 17 to 19.

In operation WR-533, the CXL memory 120 may output a second write response REP_WR2 to the second write request REQ_WR2 through the CXL memory interface circuit 121a. The CXL switch SW_CXL may transfer the second write response REP_WR2 to the CXL storage 110.

In an example embodiment, operation WR-S31 to operation WR-S33 (i.e., an operation of storing map data in the CXL memory 120 or an operation of updating map data) may be performed when the write operation for the CXL storage 110 is completed. Alternatively, operation WR-S31 to operation WR-S33 may be performed when the size of map data updated or newly generated reaches a given value. Alternatively, operation WR-S31 to operation WR-S33 may be performed periodically. However, example embodiments are not limited thereto. For example, map data that are generated or updated during the operation of the CXL storage 110 may be stored in the CXL memory 120 depending on various operation policies.

Figure 10:
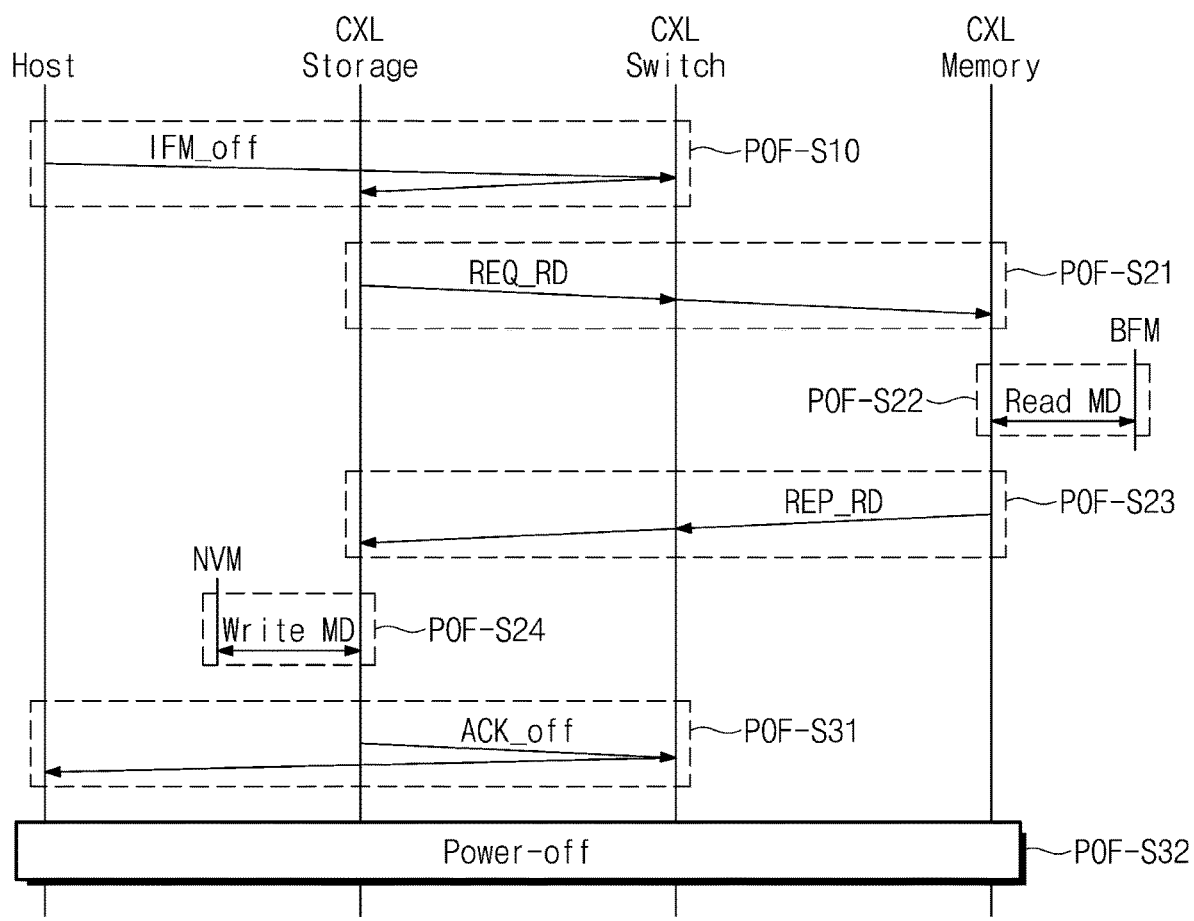
FIG. 10 is a flowchart illustrating a power-off operation of a computing system, according to an example embodiment.

FIG. 10 is a flowchart illustrating a power-off operation of a computing system, such as the computing system 100, according to an example embodiment. In an example embodiment, a power-off operation of a computing system will be described with reference to FIG. 10, but example embodiments are not limited thereto. For example, it may be understood that the method of FIG. 10 is applicable to the power-off operation or reset operation of each of various components (e.g., a host, CXL storage, a CXL memory, and a CXL switch) included in the computing system.

Referring to FIGS. 2 and 10, in operation POF-S10, the host 101 may output power-off information IFM_off through the CXL host interface circuit 101a. The CXL switch SW_CXL may transfer the power-off information IFM_off to the CXL storage 110. For example, the host 101 may recognize or detect information about power-off of the computing system 100. The host 101 may send the power-off information IFM_off to the CXL storage 110 through the CXL switch SW_CXL such that the CXL storage 110 performs a power-off operation.

In operation POF-S21, the CXL storage 110 may output a read request REQ_RD through the CXL storage interface circuit 111a in response to the power-off information IFM_off. The CXL switch SW_CXL may transfer the read request REQ_RD to the CXL memory 120. In an example embodiment, the read request REQ_RD in operation POF-S21 may refer to a request for reading the entire map data MD stored in the CXL memory 120. The read request REQ_RD may include a memory address of an area where the map data MD are stored.

In operation POF-S22, the CXL memory 120 may read the map data MD in response to the read request REQ_RD. For example, the CXL memory 120 may read the map data MD from the buffer memory BFM based on the memory address included in the read request REQ_RD.

In operation POF-S23, the CXL memory 120 may output a read response REP_RD to the read request REQ_RD through the CXL memory interface circuit 121a. The CXL switch SW_CXL may transfer the read response REP_RD to the CXL storage 110.

In operation POF-S24, the CXL storage 110 may write the map data MD included in the read response REP_RD in the nonvolatile memory NVM. In an example embodiment, the CXL storage 110 may store the map data MD in a given area of the nonvolatile memory NVM.

After the entire map data MD associated with the CXL storage 110 are stored in the nonvolatile memory NVM, in operation POF-S31, the CXL storage 110 may output a response ACK_off to the power-off information IFM_off. The CXL switch SW_CXL may send the response ACK_off to the host 101. The host 101 may recognize that the map data MD present in the CXL memory 120 are normally stored in the CXL storage 110, based on the response ACK_off.

Afterwards, in operation POF-S32, the host 101, the CXL storage 110, the CXL memory 120, and the CXL switch SW_CXL may be powered off. For example, a power that is provided to the host 101, the CXL storage 110, the CXL memory 120, and the CXL switch SW_CXL may be interrupted.

The power-off operation described with reference to FIG. 10 is provided as an example, and example embodiments are not limited thereto. For example, as shown in FIG. 10, after the CXL storage 110 stores the map data MD present in the CXL memory 120 in the nonvolatile memory NVM, the CXL storage 110 may provide notification that the map data MD are completely backed up, by sending acknowledge ACK_off to the host 101 (i.e., an interrupt manner). Alternatively, the CXL storage 110 may set a value of a specific register to a given value after storing the map data MD present in the CXL memory 120 in the nonvolatile memory NVM. The host 101 may check whether the map data MD are completed backed up, by periodically checking the value of the specific register of the CXL storage 110 (a polling manner). Alternatively, the CXL storage 110 may be configured to complete a backup operation for the map data MD within a given time from a point in time when the power-off information IFM_off is received from the host 101 (a time-out manner). As described above, the CXL storage 110 may transfer information about backup completion of the map data MD to the host 101 through at least one of various manners.

In an example embodiment, the power-off operation may be changed depending on an operation manner of the CXL storage 110. For example, when the CXL storage 110 performs the write operation, the CXL storage 110 may perform the program operation on the nonvolatile memory NVM and thus may update the map data MD.

In an example embodiment, the operation of updating the map data MD may be performed only on the CXL memory 120. In this case, the map data MD stored in the CXL memory 120 may be up-to-date information, and the map data MD stored in the nonvolatile memory NVM may not be up-to-date information. That is, when the operation of updating the map data MD is performed only on the CXL memory 120, up-to-date information about the map data MD is maintained only in the CXL memory 120; for this reason, when the CXL storage 110, the CXL memory 120, or the computing system 100 is powered off, an operation of flushing, backing up, or dumping the map data MD from the CXL memory 120 is required.

In an example embodiment, the map data (MD) update operation may be first performed with respect to the map data MD stored in the nonvolatile memory NVM and may then be performed with respect to the map data MD stored in the CXL memory 120 through the background operation. In this case, because the map data MD stored in the nonvolatile memory NVM are guaranteed to be up-to-date, the operation of flushing, dumping, or backing up the map data MD from the CXL memory 120 may not be required when the CXL storage 110, the CXL memory 120, or the computing system 100 is powered off.

In an example embodiment, the map data update operation may be first performed with respect to the map data MD stored in the CXL memory 120 and may then be performed with respect to the map data MD stored in the nonvolatile memory NVM through the background operation. In this case, the map data MD stored in the CXL memory 120 may be up-to-date information, and the map data MD stored in the nonvolatile memory NVM may not be up-to-date information. As such, when the CXL storage 110, the CXL memory 120, or the computing system 100 is powered off, at least a portion of the map data MD of the CXL memory 120 has to be backed up to the nonvolatile memory NVM of the CXL storage 110. In an example embodiment, at least a portion of the map data MD to be backed up to the nonvolatile memory NVM may be the up-to-date map data MD that are not stored in the nonvolatile memory NVM. In an example embodiment, the CXL storage 110 may manage or store flag information or table information indicating that the map data MD stored in the nonvolatile memory NVM are up-to-date information.

As described above, when the CXL storage 110, the CXL memory 120, or the computing system 100 is powered off, depending on a method used to manage the map data MD (i.e., depending on a place where up-to-date information is managed), the map data MD may be selectively flushed, backed up, or dumped to the CXL storage 110 from the CXL memory 120.

Figure 11:
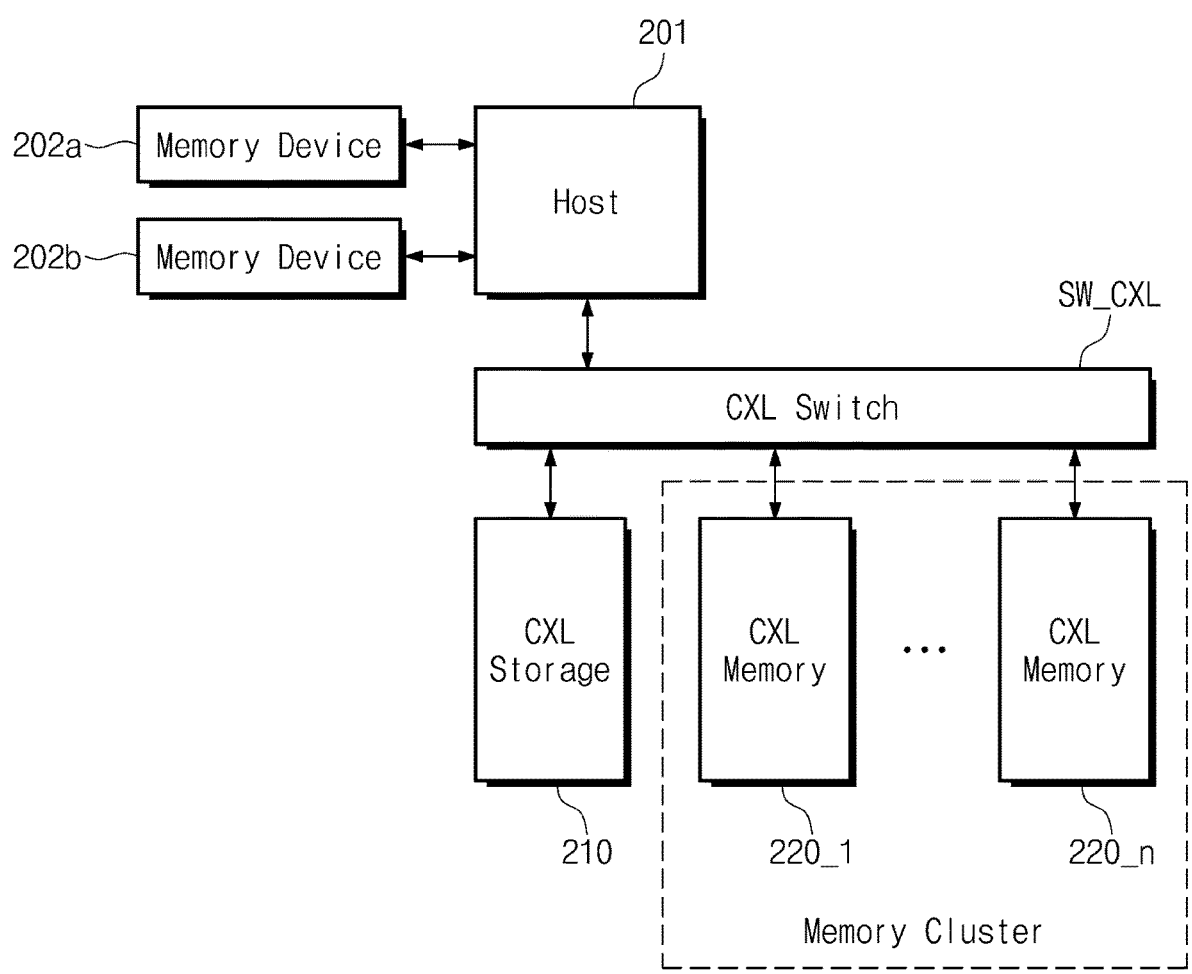
FIG. 11 is a block diagram of a computing system according to an example embodiment.

FIG. 11 is a block diagram of a computing system according to an example embodiment. Below, for convenience of description, additional description associated with the components described above will be omitted to avoid redundancy. Referring to FIG. 11, a computing system 200 may include a host 201, a plurality of memory devices 202a and 202b, the CXL switch SW_CXL, CXL storage 210, and a plurality of CXL memories 220_1 to 220_n.

The host 201 may be directly connected with the plurality of memory devices 202a and 202b. The host 201, the CXL storage 210, and the plurality of CXL memories 220_1 to 220_n may be connected with the CXL switch SW_CXL and may communicate with each other through the CXL switch SW_CXL.

In an example embodiment, each of the plurality of CXL memories 220_1 to 220_n may have a structure similar to that of the CXL memory 120 described with reference to FIGS. 2 to 10. That is, each of the plurality of CXL memories 220_1 to 220_n may be implemented with an individual memory device or memory module and may be connected with the CXL switch SW_CXL through different physical ports. As the plurality of CXL memories 220_1 to 220_n are connected with the CXL switch SW_CXL, a memory area (or capacity) that is managed by the host 201 may increase.

In an example embodiment, the host 201 may manage the plurality of CXL memories 220_1 to 220_n as one memory cluster. In an example embodiment, the host 201 may allocate at least some of the plurality of CXL memories 220_1 to 220_n for a memory dedicated for the CXL storage 210. Alternatively, the host 201 may allocate at least a partial area of each of the plurality of CXL memories 220_1 to 220_n for a memory dedicated for the CXL storage 210.

Figure 12:
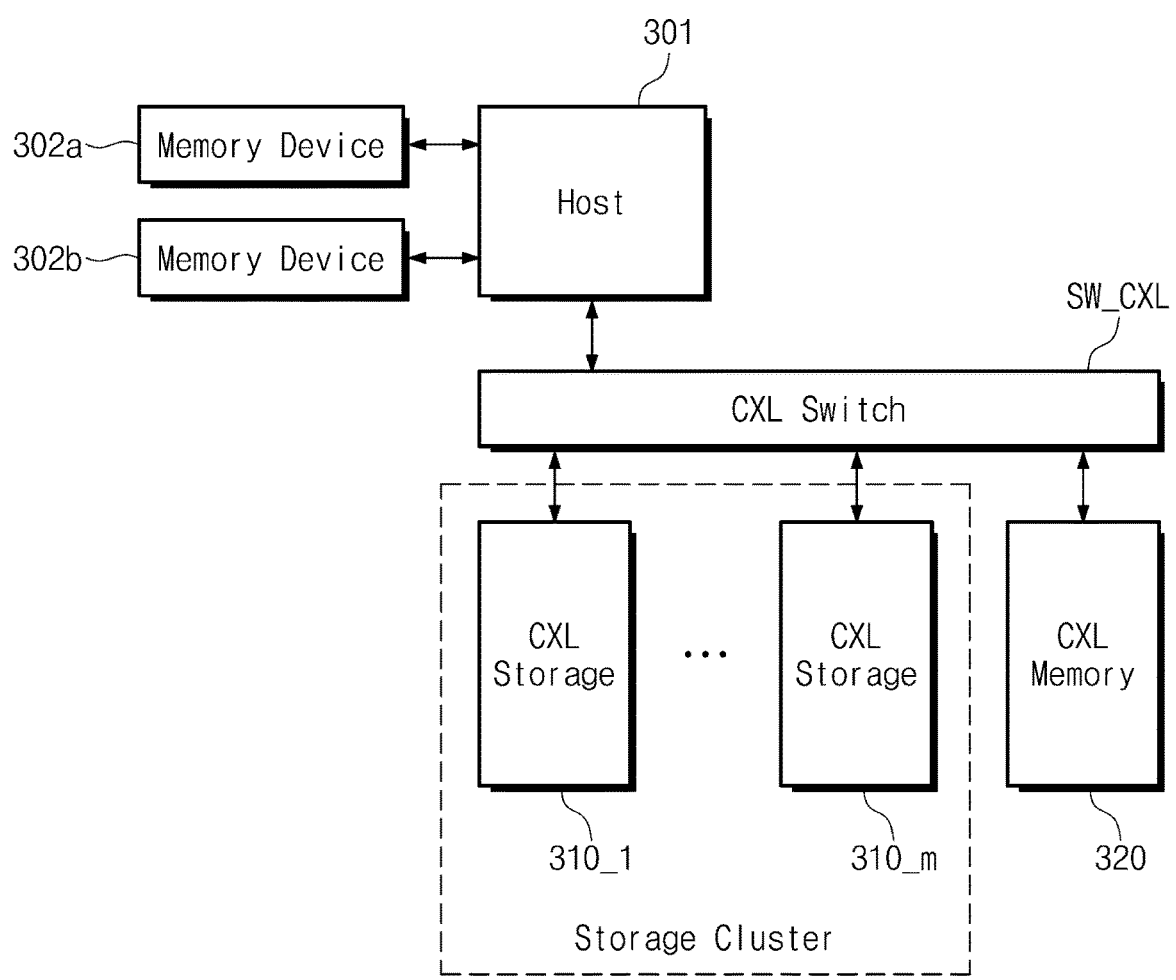
FIG. 12 is a block diagram of a computing system according to an example embodiment.

FIG. 12 is a block diagram of a computing system according to an example embodiment. Below, for convenience of description, additional description associated with the components described above will be omitted to avoid redundancy. Referring to FIG. 12, a computing system 300 may include a host 301, a plurality of memory devices 302a and 302b, the CXL switch SW_CXL, a plurality of CXL storages 310_1 to 310_m, and a CXL memory 320.

The host 301 may be directly connected with the plurality of memory devices 302a and 302b. The host 301, the plurality of CXL storages 310_1 to 310_m, and the CXL memory 320 may be connected with the CXL switch SW_CXL and may communicate with each other through the CXL switch SW_CXL.

In an example embodiment, each of the plurality of CXL storages 310_1 to 310_m may have a structure similar to that of the CXL storage 110 described with reference to FIGS. 2 to 10. That is, each of the plurality of CXL storages 310_1 to 310_m may be implemented with an individual storage device or storage module and may be connected with the CXL switch SW_CXL through different physical ports. As the plurality of CXL storages 310_1 to 310_m are connected with the CXL switch SW_CXL, a storage area (or capacity) that is available by the host 201 may increase.

In an example embodiment, at least a partial area of the CXL memory 320 may be allocated for an area dedicated for the plurality of CXL storages 310_1 to 310_m. For example, the host 301 may manage the plurality of CXL storages 310_1 to 310_m as one storage cluster and may allocate a partial area of the CXL memory 320 for a dedicated area of one storage cluster. Alternatively, the host 201 may allocate partial areas of the CXL memory 320 for dedicated areas of the respective CXL storages 310_1 to 310_m.

Figure 13:
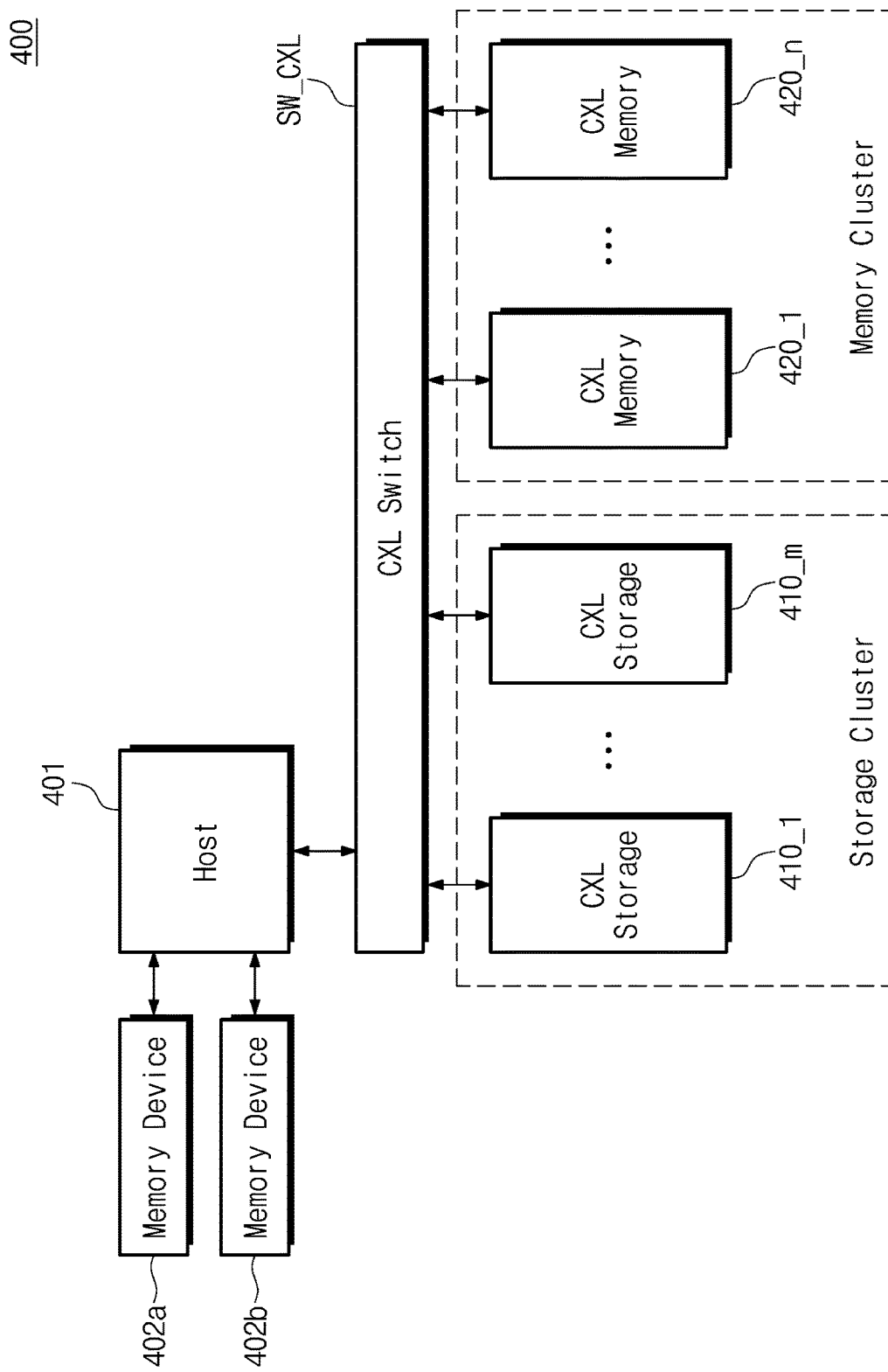
FIG. 13 is a block diagram of a computing system according to an example embodiment.

FIG. 13 is a block diagram of a computing system according to an example embodiment. Below, for convenience of description, additional description associated with the components described above will be omitted to avoid redundancy. Referring to FIG. 13, a computing system 400 may include a host 401, a plurality of memory devices 402a and 402b, the CXL switch SW_CXL, a plurality of CXL storages 410_1 to 410_m, and a plurality of CXL memories 420_1 to 420_n.

The host 401 may be directly connected with the plurality of memory devices 402a and 402b. The host 401, the plurality of CXL storages 410_1 to 410_m, and the plurality of CXL memories 420_1 to 420_n may be connected with the CXL switch SW_CXL and may communicate with each other through the CXL switch SW_CXL.

In an example embodiment, the host 401 may manage the plurality of CXL storages 410_1 to 410_m as one storage cluster, and may mange the plurality of CXL memories 420_1 to 420_n as one memory cluster. The host 401 may allocate a partial area of the memory cluster for a dedicated area (i.e., an area for storing map data of the storage cluster) of the storage cluster. Alternatively, the host 201 may allocate areas of the CXL memories 420_1 to 420_n for dedicated areas of the respective CXL storages 410_1 to 410m.

Figure 14:
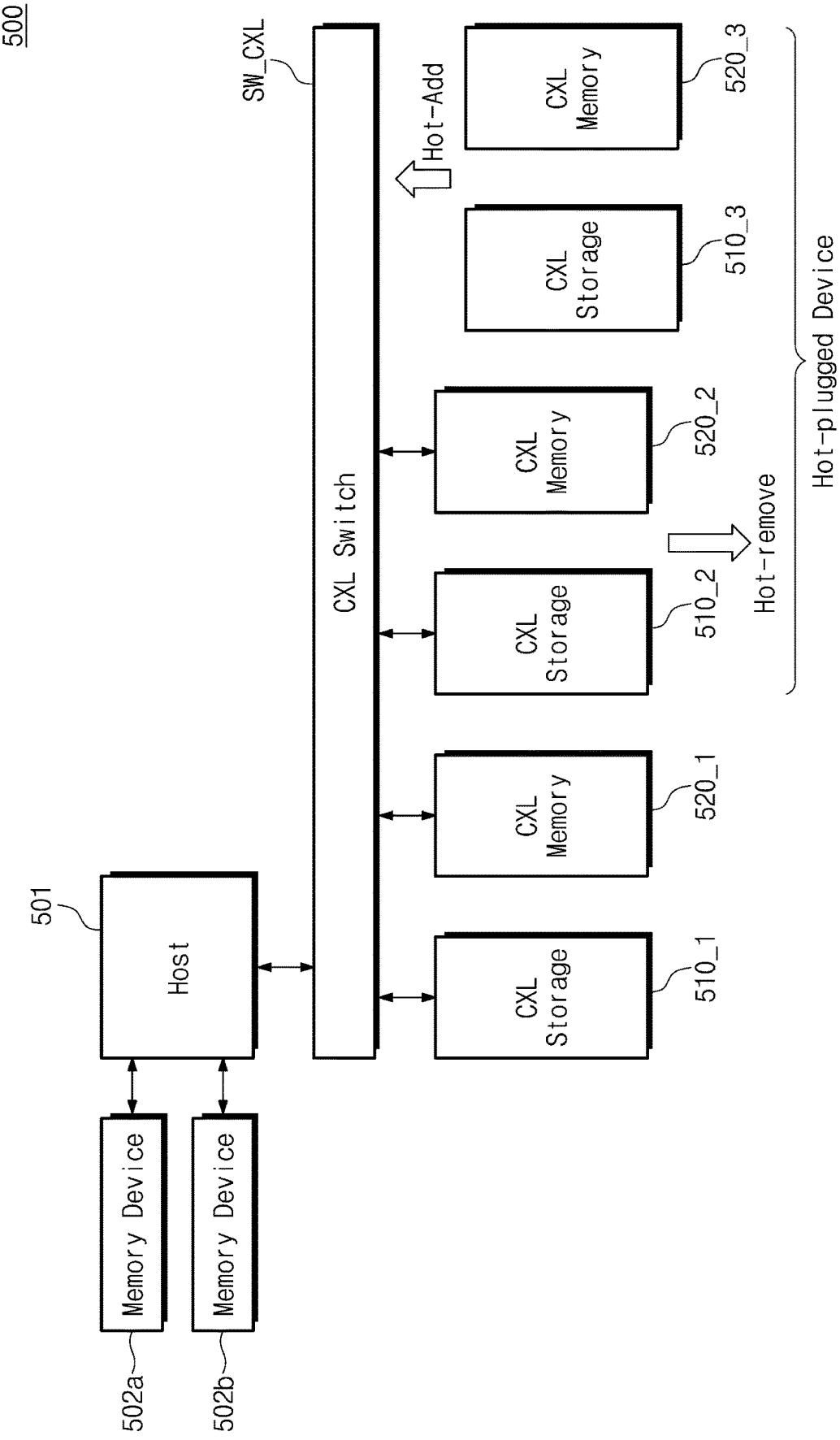
FIG. 14 is a block diagram of a computing system according to an example embodiment.

FIG. 14 is a block diagram of a computing system according to an example embodiment. Below, for convenience of description, additional description associated with the components described above will be omitted to avoid redundancy. Referring to FIG. 14, a computing system 500 may include a host 501, a plurality of memory devices 502a and 502b, the CXL switch SW_CXL, a plurality of CXL storages 510_1, 510_2, and 510_3, and a plurality of CXL memories 520_1, 520_2, and 502_3.

The host 501 may be directly connected with the plurality of memory devices 502a and 502b. The host 501, the plurality of CXL storages 510_1 and 510_2, and the plurality of CXL memories 520_1 and 520_2 may be connected with the CXL switch SW_CXL and may communicate with each other through the CXL switch SW_CXL. As in the above description, a partial area of the CXL memories 520_1 and 520_2 may be allocated for a dedicated area of the CXL storages 510_1 and 510_2.

In an example embodiment, while the computing system 500 is being driven, some of the CXL storages 510_1 and 510_2 or some of the CXL memories 520_1 and 520_2 may be hot-removed from the CXL switch SW_CXL. Alternatively, while the computing system 500 is being driven, the CXL storage 510_3 or the CXL memory 520_3 may be hot-added to the CXL switch SW_CXL. In these cases, the host 501 may again perform memory allocation by again performing the initialization operation on devices connected with the CXL switch SW_CXL through the reset operation or the hot-plug operation. That is, CXL storage and a CXL memory according to an example embodiment may support the hot-plug function, and may make it possible to expand a storage capacity and a memory capacity of a computing system through various connections.

Figure 15:
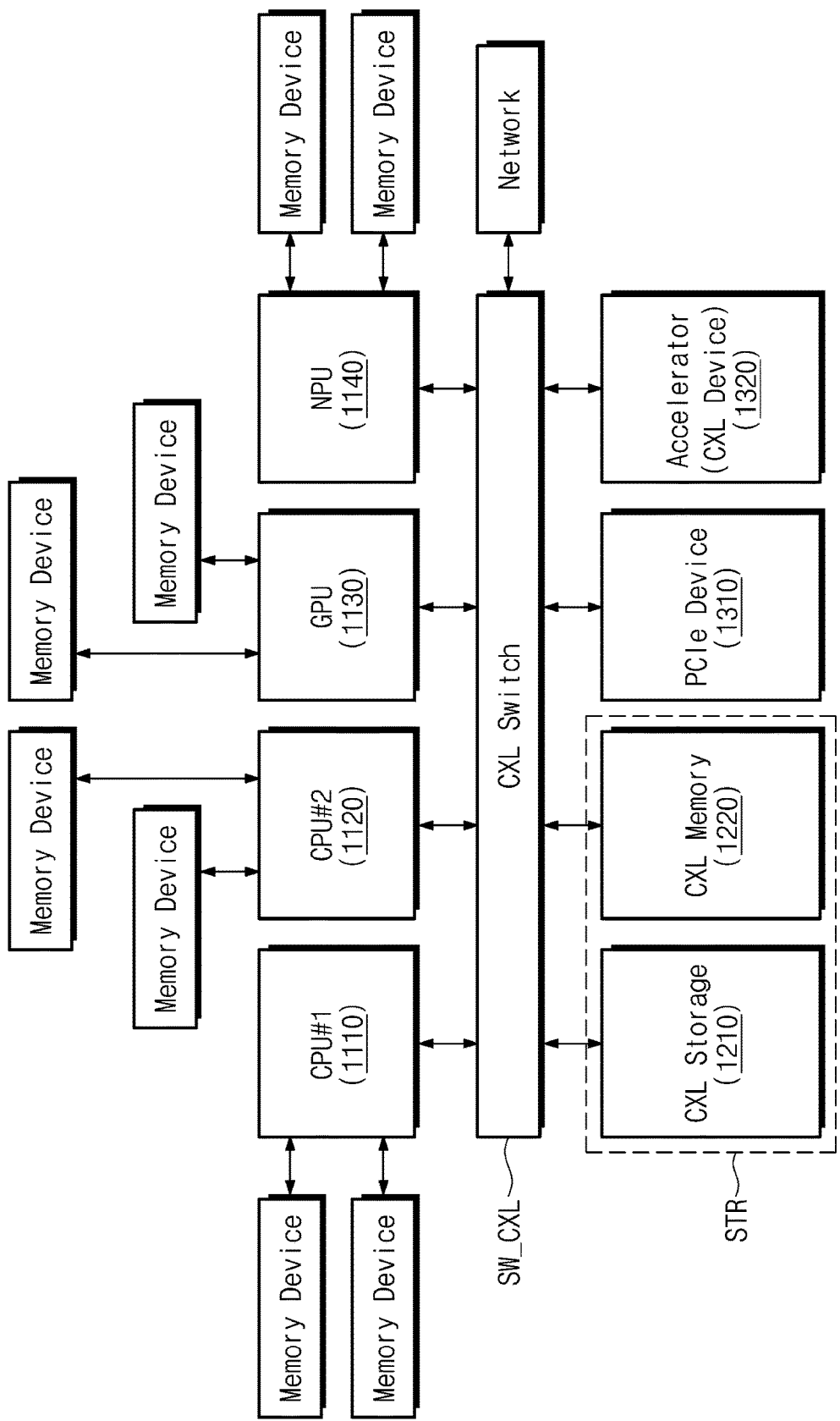
FIG. 15 is a block diagram of a computing system according to an example embodiment.

FIG. 15 is a block diagram of a computing system according to an example embodiment. For convenience of description, additional description associated with the components described above will be omitted to avoid redundancy. Referring to FIG. 15, a computing system 1000 may include a first CPU 1110, a second CPU 1120, a GPU 1130, an NPU 1140, the CXL switch SW_CXL, CXL storage 1210, a CXL memory 1220, a PCIe device 1310, and an accelerator (CXL device) 1320.

The first CPU 1110, the second CPU 1120, the GPU 1130, the NPU 1140, the CXL storage 1210, the CXL memory 1220, the PCIe device 1310, and the accelerator (CXL device) 1320 may be connected in common with the CXL switch SW_CXL and may communicate with each other through the CXL switch SW_CXL.

In an example embodiment, each of the first CPU 1110, the second CPU 1120, the GPU 1130, and the NPU 1140 may correspond to the hosts described with reference to FIGS. 1 to 14 and may be directly connected with individual memory devices.

In an example embodiment, the CXL storage 1210 and the CXL memory 1220 may be the CXL storage and the CXL memory described with reference to FIGS. 2 to 14, and at least a partial area of the CXL memory 1220 may be allocated for an area dedicated for the CXL storage 1210 by one or more of the first CPU 1110, the second CPU 1120, the GPU 1130, and the NPU 1140. That is, the CXL storage 1210 and the CXL memory 1220 may be used as a storage space STR of the computing system 1000.

In an example embodiment, the CXL switch SW_CXL may be connected with the PCIe device 1310 or the accelerator 1320 configured to support various functions, and the PCIe device 1310 or the accelerator 1320 may communicate with each of the first CPU 1110, the second CPU 1120, the GPU 1130, and the NPU 1140 through the CXL switch SW_CXL or may access the storage space STR including the CXL storage 1210 and the CXL memory 1220 through the CXL switch SW_CXL.

In an example embodiment, the CXL switch SW_CXL may be connected with an external network or Fabric and may be configured to communicate with an external server through the external network or Fabric.

Figure 16:
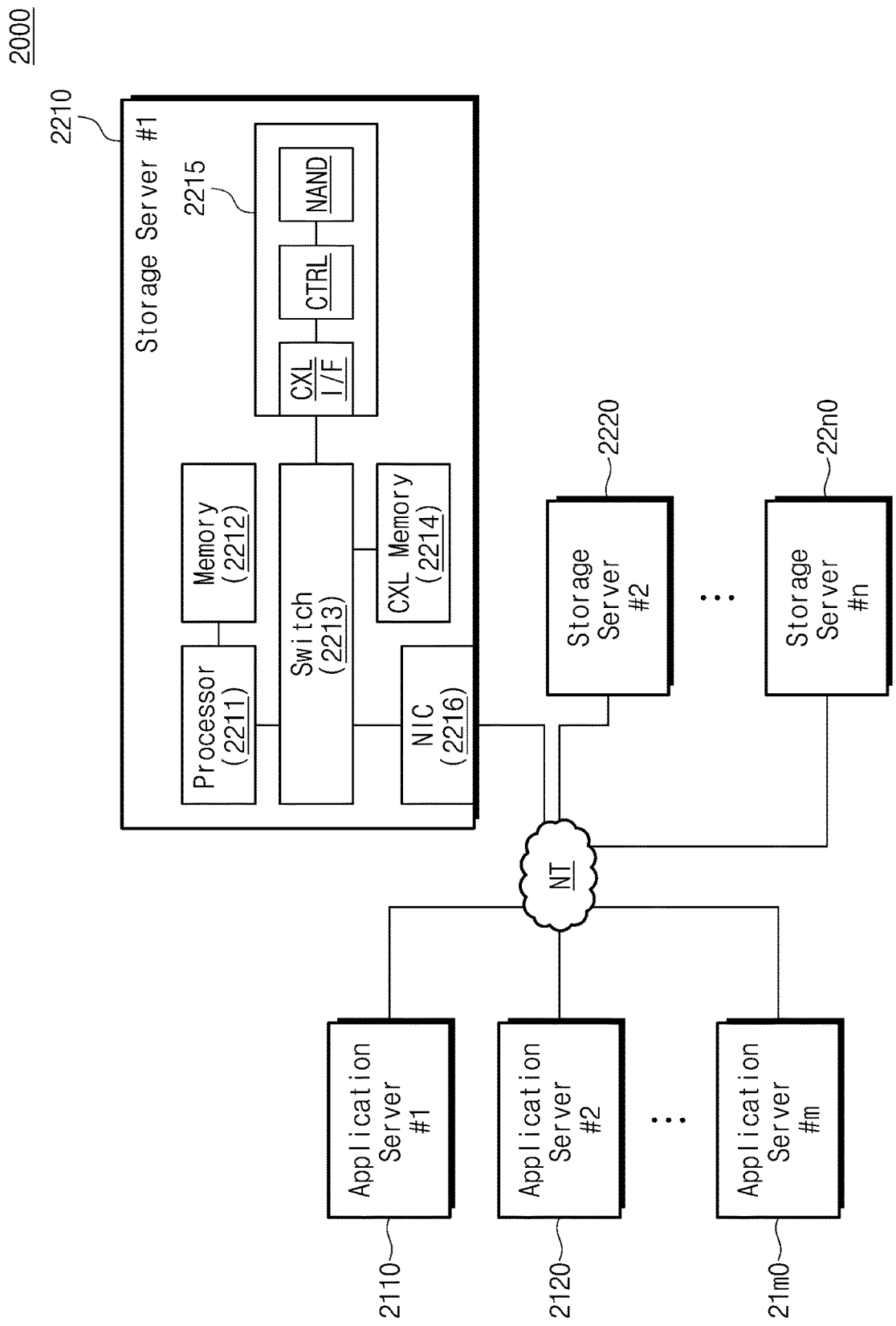
FIG. 16 is a block diagram illustrating a data center to which a computing system according to an example embodiment.

FIG. 16 is a block diagram illustrating a data center to which a computing system according to an example embodiment is applied. Referring to FIG. 16, a data center 2000 that is a facility collecting various data and providing services may be referred to as a data storage center. The data center 2000 may be a system for operating a search engine and a database, and may be a computing system used in a business such as a bank or in a government institution. The data center 2000 may include application servers 2110 to 21$m$0 and storage servers 2210 to 22$n$0. The number of application servers and the number of storage servers may be variously selected depending on an example embodiment, and the number of application servers and the number of storage servers may be different from each other.

Below, a configuration of the first storage server 2210 will be mainly described. The application servers 2110 to 21$m$0 may have similar structures, the storage servers 2210 to 22$n$0 may have similar structures, and the application servers 2110 to 21$m$0 and the storage servers 2210 to 22$n$0 may communicate with each other over a network NT.

The first storage server 2210 may include a processor 2211, a memory 2212, a switch 2213, a storage device 2215, a CXL memory 2214, and a network interface card (NIC) 2216. The processor 2211 may control an overall operation of the first storage server 2210 and may access the memory 2212 to execute an instruction loaded onto the memory 2212 or to process data. The memory 2212 may be implemented with a Double Data Rate Synchronous DRAM (DDR SDRAM), a High Bandwidth Memory (HBM), a Hybrid Memory Cube (HMC), a Dual In-line Memory Module (DIMM), an Optane DIMM, and/or a nonvolatile DIMM (NVMDIMM). The processor 2211 and the memory 2212 may be directly connected, and the numbers of processors 2211 and memories 2212 included in one storage server 2210 may be variously selected.

In an example embodiment, the processor 2211 and the memory 2212 may provide a processor-memory pair. In an example embodiment, the number of processors 2211 and the number of memories 2212 may be different from each other. The processor 2211 may include a single core processor or a multi-core processor. The detailed description of the storage server 2210 may be similarly applied to the application servers 2110 to 21$m$0.

The switch 2213 may be configured to arbitrate or route the communications between various components included in the first storage server 2210. In an example embodiment, the switch 2213 may be implemented with the CXL switch SW_CXL described with reference to FIGS. 1 to 15. That is, the switch 2213 may be a switch implemented based on the CXL protocol.

The CXL memory 2214 may be connected with the switch 2213. In an example embodiment, the CXL memory 2214 may be used as a memory expander for the processor 2211. Alternatively, as described with reference to FIGS. 1 to 15, the CXL memory 2214 may be allocated for a dedicated memory or a buffer memory of the storage device 2215.

The storage device 2215 may include a CXL interface circuit CXL_IF, a controller CTRL, and a NAND flash NAND. According to a request of the processor 2211, the storage device 2215 may store data or may output the stored data. In an example embodiment, the storage device 2215 may be implemented with the CXL storage described with reference to FIGS. 1 to 15. In an example embodiment, as in the description given with reference to FIGS. 1 to 15, at least a partial area of the CXL memory 2214 may be allocated for a dedicated area, and the dedicated area may be used as a buffer memory (i.e., may be used to store map data in the CXL memory 2214).

According to an example embodiment, the application servers 2110 to 21$m$0 may not include the storage device 2215. The storage server 2210 may include at least one or more storage devices 2215. The number of storage devices 2215 included in the storage server 2210 may be variously selected depending on an example embodiment.

The NIC 2216 may be connected with the CXL switch SW_CXL. The NIC 2216 may communicate with the remaining storage servers 2220 to 22$n$0 or the application servers 2110 to 21$m$0 over the network NT.

In an example embodiment, the NIC 2216 may include a network interface card, a network adapter, etc. The NIC 2216 may be connected with the network NT by a wired interface, a wireless interface, a Bluetooth interface, an optical interface, etc. The NIC 2216 may include an internal memory, a digital signal processor (DSP), a host bus interface, etc. and may be connected with the processor 2211 and/or the switch 2213 through the host bus interface. In an example embodiment, the NIC 2216 may be integrated with at least one of the processor 2211, the switch 2213, and the storage device 2215.

In an example embodiment, the network NT may be implemented by using a Fibre channel (FC) or an Ethernet. In this case, the FC may be a medium that is used in high-speed data transmission and may use an optical switch that provides high performance/high availability. Storage servers may be provided as file storage, block storage, or object storage depending on an access manner of the network NT.

In an example embodiment, the network NT may be a storage-dedicated network such as a storage area network (SAN). For example, the SAN may be a FC-SAN that uses a FC network and is implemented depending on a FC protocol (FCP). For another example, the SAN may be an IP-SAN that uses a TCP/IP network and is implemented depending on an iSCSI (SCSI over TCP/IP or Internet SCSI). In an example embodiment, the network NT may be a legacy network such as a TCP/IP network. For example, the network NT may be implemented depending on the following protocol: FC over Ethernet (FCoE), Network Attached Storage (NAS), or NVMe over Fabrics (NVMe-oF).

In an example embodiment, at least one of the application servers 2110 to 21*m*0 may store data, which are store-requested by a user or a client, in one of the storage servers 2210 to 22*n*0 over the network NT. At least one of the application servers 2110 to 21*m*0 may obtain data, which are read-requested by the user or the client, from one of the storage servers 2210 to 22*n*0 over the network NT. For example, at least one of the application servers 2110 to 21*m*0 may be implemented with a web server, a database management system (DBMS), etc.

In an example embodiment, at least one of the application servers 2110 to 21*m*0 may access a memory, a CXL memory, or a storage device included in any other application server over the network NT or may access memories, CXL memories, or storage devices included in the storage servers 2210 to 22*n*0 over the network NT. As such, at least one of the application servers 2110 to 21*m*0 may perform various operations on data stored in the remaining application servers and/or storage servers. For example, at least one of the application servers 2110 to 21*m*0 may execute an instruction for moving or copying data between the remaining application servers and/or storage servers. In this case, the data may be moved from storage devices of storage servers to memories or CXL memories of application servers through memories or CXL memories of the storage servers or directly. The data that are transferred over a network may be data that are encrypted for security or privacy.

In an example embodiment, a CXL memory included in at least one of the application servers 2110 to 21*m*0 and the storage servers 2210 to 22*n*0 may be allocated for a dedicated area of a storage device included in at least one of the application servers 2110 to 21*m*0 and the storage servers 2210 to 22*n*0, and the storage device may use the dedicated area thus allocated as a buffer memory (i.e., may store map data in the dedicated area). For example, a CXL memory included in a storage server (e.g., 22*n*0) may be allocated to the storage device 2215 included in the storage server 2210, and the storage device 2215 included in the storage server 2210 may access the CXL memory included in the storage server (e.g., 22*n*0) over the switch 2213 and the NIC 2216. In this case, the map data associated with the storage device 2215 of the first storage server 2210 may be stored in the CXL memory of the storage server 22*n*0. That is, storage devices and CXL memories of the data center according to example embodiments may be connected and implemented in various manners.

Figure 17:
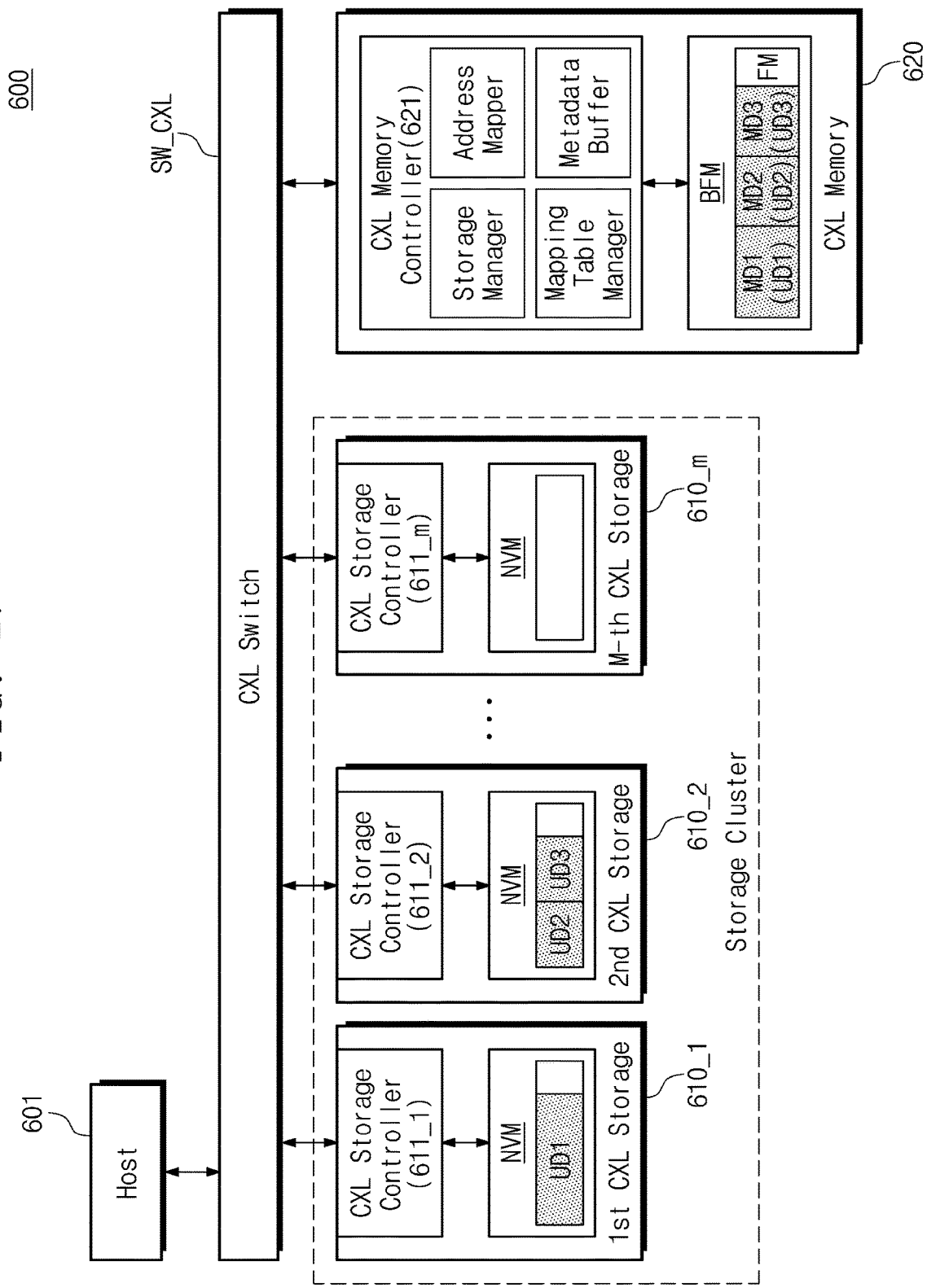
FIG. 17 is a block diagram of a computing system according to an example embodiment.

FIG. 17 is a block diagram of a computing system according to an example embodiment. Below, for convenience of description, additional description associated with the components described above will be omitted to avoid redundancy. Referring to FIG. 17, a computing system 600 may include a host 601, the CXL switch SW_CXL, a plurality of CXL storages 610_1 to 610_*m*, and a CXL memory 620.

The host 601, the plurality of CXL storages 610_1 to 610_*m*, and the CXL memory 620 may be connected with the CXL switch SW_CXL and may communicate with each other through the CXL switch SW_CXL. That is, the CXL switch SW_CXL may provide an interface between the host 601, the plurality of CXL storages 610_1 to 610_*m*, and the CXL memory 620.

The plurality of CXL storages 610_1 to 610_*m* may be referred to as a storage cluster that is managed by the host 601. The plurality of CXL storages 610_1 to 610_*m* may be also referred to as first to m-th CXL storages 610_1 to 610_*m*.

The first CXL storage 610_1 may include a CXL storage controller 611_1 and the nonvolatile memory NVM. The CXL storage controller 611_1 may store data in the nonvolatile memory NVM or may manage operations of reading the stored data. The second CXL storage 610_2 may include a CXL storage controller 611_2 and the nonvolatile memory NVM. As in the above description, the m-th CXL storage 610_*m* may include a CXL storage controller 611_*m* and the nonvolatile memory NVM. Herein, m is a natural number.

The CXL memory 620 may include a CXL memory controller 621 and the buffer memory BFM. The CXL memory controller 621 may communicate with the plurality of CXL storages 610_1 to 610_*m* through the CXL switch SW_CXL. The CXL memory controller 621 may identify target CXL storage among the plurality of CXL storages 610_1 to 610_*m* and may process a mapping request from the identified target CXL storage.

The mapping request may refer to a request for generating map data corresponding to user data stored in the target CXL storage. The map data may indicate the relationship between a physical block address and a logical block address of the user data. The mapping request may correspond to the write request REQ_WR in operation PUP-S44 of FIG. 4 or may correspond to the second write request REQ_WR2 in operation WR-S31 of FIG. 9.

The CXL memory controller 621 may include a storage manager, a mapping table manager, an address mapper, and a metadata buffer.

The storage manager may manage the plurality of CXL storages 610_1 to 610_*m*. For example, the first CXL storage 610_1 of the plurality of CXL storages 610_1 to 610_*m* may provide the mapping request to the CXL memory 620. The storage manager may recognize the first CXL storage 610_1 of the plurality of CXL storages 610_1 to 610_*m* and may authorize the use permission to the first CXL storage 610_1 thus recognized.

The mapping table manager may manage map data to be stored in the buffer memory BFM. The mapping table manager may generate the map data by allocating the map data to the buffer memory BFM. The mapping table manager may modify the map data by changing the map data allocated to the buffer memory BFM. The mapping table manager may delete the map data by deallocating the map data allocated to the buffer memory BFM.

In an example embodiment, the mapping table manager may dynamically manage the map data. The dynamic management of the map data may indicate allocation of map data that corresponds to a size of user data under current processing or a capacity of CXL storage used to store the user data under current processing, instead of allocating the entire map data of the plurality of CXL storages 610_1 to 610_m.

For example, the first CXL storage 610_1 may store the first user data UD1. The second CXL storage 610_2 may store the second user data UD2 and the third user data UD3. The mapping table manager may allocate the first to third map data MD1 to MD3 corresponding to the first to third user data UD1 to UD3 under current processing to the buffer memory BFM depending on mapping requests. A portion of the buffer memory BFM, to which the first to third map data MD1 to MD3 are not allocated, may be referred to as a free memory FM. The free memory FM may be used to store any other map data that is subsequently generated, to temporarily store any other user data, or to manage the computing system 600.

In an example embodiment, the mapping table manager may variably set a size of a block. For example, the mapping table manager may receive the mapping request including metadata of the first user data UD1 from the first CXL storage 610_1. The metadata may refer to data describing a characteristic of the user data. The metadata may be used to determine a standard (e.g., an allocation size, a block size, the number of blocks, and a data structure) of map data. The metadata may be provided from the host 601.

The mapping table manager may determine the standard corresponding to the metadata based on the mapping request. The standard may include a block size corresponding to the logical block address of the first user data UD1. The mapping table manager may set the block size small so as to be optimized for high-speed read and write operations or may set the block size greatly so as to be optimized for the management of a large amount of data. The mapping table manager may allocate the map data to the buffer memory BFM depending on the block size thus set.

The address mapper may generate the mapping relationship between the physical block address and the logical block address of the user under control of the mapping table manager. For example, the address mapper may receive identification information of the recognized CXL storage from the storage manager. The address mapper may generate the mapping relationship between the physical block address and the logical block address of the user data of the recognized CXL storage under control of the mapping table manager. The mapping relationship may be used for the mapping table manager to manage the map data.

The metadata buffer may store the metadata received from the target CXL storage through the CXL switch SW_CXL. For example, the metadata buffer may receive the mapping request including the metadata of the first user data UD1 from the first CXL storage 610_1. The metadata buffer may temporarily store the metadata of the mapping request.

The buffer memory BFM may communicate with the CXL memory controller 621. The buffer memory BFM may store data in the plurality of CXL storages 610_1 to 610_m or may store the map data that are used to read the stored data.

In an example embodiment, the buffer memory BFM may dynamically store the map data. For example, the buffer memory BFM may store only the first to third map data MD1 to MD3 corresponding to the first to third user data UD1 to UD3 under current processing, instead of the entire map data associated with the total capacity of the plurality of CXL storages 610_1 to 610_m.

As described above, according to an example embodiment, the computing system may dynamically manage the map data. The computing system may efficiently use the buffer memory with the limited capacity by allocating only the map data corresponding to storage being currently used or the user data under current processing to the buffer memory. Also, the computing system may be optimized for the high-speed data input/output and the management of a large amount of data by variably adjusting the block size.

Figure 18:
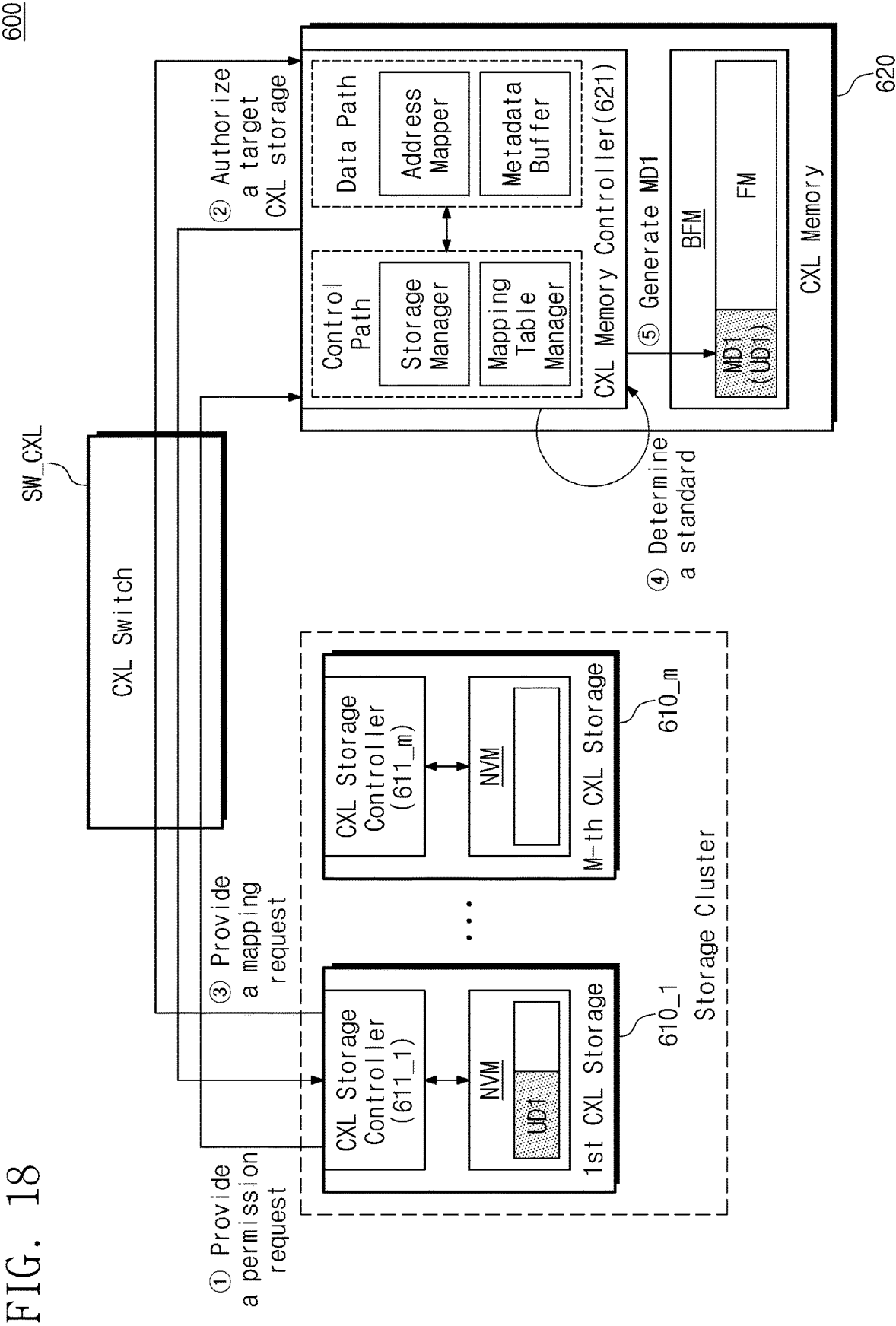
FIG. 18 is a block diagram describing a method of operating a computing system according to an example embodiment.

FIG. 18 is a block diagram describing a method of operating a computing system according to an example embodiment. Referring to FIG. 18, the computing system 600 may include the CXL switch SW_CXL, the plurality of CXL storages 610_1 to 610_m, and the CXL memory 620. The CXL switch SW_CXL, the plurality of CXL storages 610_1 to 610_m, and the CXL memory 620 may respectively correspond to the CXL switch SW_CXL, the plurality of CXL storages 610_1 to 610_m, and the CXL memory 620 of FIG. 17.

The CXL memory controller 621 of the CXL memory 620 may include a control path and a data path. The control path may refer to a path where various functions such as management of CXL storage and map data are performed. The control path may include the storage manager and the mapping table manager. The data path may refer to a path where actual data are transferred. The data path may include the address mapper and the metadata buffer.

In an example embodiment, the control path and the data path may be designed to be separated from each other. For example, the data path may be implemented with a high-performance circuit, device or module for the purpose of transferring a relatively large amount of data. As another example, the control path may be implemented by software, and the data path may be implemented with hardware. However, example embodiments are not limited thereto.

Below, an operation in which the computing system 600 according to an example embodiment generates map data will be described.

In a first operation ①, the first CXL storage 610_1 may provide a permission request to the CXL memory 620 through the CXL switch SW_CXL. The permission request may be used to request the use permission from the first CXL storage 610_1 of the plurality of CXL storages 610_1 to 610_m.

In a second operation ②, the CXL memory 620 may authorize the use permission to the first CXL storage 610_1 based on the permission request from the first CXL storage 610_1. For example, the storage manager of the CXL memory 620 may recognize the first CXL storage 610_1 and may provide a response to the permission request to the first CXL storage 610_1 through the CXL switch SW_CXL.

In an example embodiment, the CXL memory 620 may authorize the use permission to the first CXL storage 610_1 based on a residual capacity of the buffer memory BFM and the limitation on the number of CXL storages to be managed.

For example, the buffer memory BFM of the CXL memory 620 may have a limited capacity. The number of CXL storages that the CXL memory 620 is capable of simultaneously controlling may be limited to a reference number. When the capacity of the free memory FM in the buffer memory BFM is determined to be greater than a reference capacity for storing the first map data MD1 and the number of CXL storages that the CXL memory 620 currently manages is smaller than the reference number, the CXL memory 620 may authorize the use permission to the first CXL storage 610_1.

In a third operation ③, the first CXL storage 610_1 to which the use permission is authorized may provide the mapping request to the CXL memory 620 through the CXL switch SW_CXL. The mapping request may refer to a request for writing the map data in the buffer memory BFM. For example, the first CXL storage 610_1 may provide the CXL memory 620 with the mapping request including first metadata of the first user data UD1.

In an example embodiment, the first, second, and third operations ①, ②, and ③ may be performed in a peer-to-peer (P2P) manner. For example, the first CXL storage 610_1 and the CXL memory 620 may communicate with each other through the CXL switch SW_CXL and may allocate a memory (i.e., may generate the map data) without intervention of the host. As such, the overhead of the host may decrease, and an operating speed of the computing system 600 may be improved.

In an example embodiment, the first, second, and third operations ①, ②, and ③ may be performed based on the CXL interface. For example, the first, second, and third operations ①, ②, and ③ may be performed by using the CXL.mem.

In a fourth operation ④, the CXL memory 620 may determine the standard corresponding to the metadata based on the mapping request received from the first CXL storage 610_1.

In a fifth operation ⑤, the CXL memory 620 may generate the first map data MD1 indicating the relationship between the physical block address and the logical block address of the first user data UD1 based on the determined standard. The first map data MD1 may be stored in the buffer memory BFM. The first map data MD1 may be used in the following read operation, may be replaced by the following write operation, or may be returned to the first CXL storage 610_1 before the power-off.

Figure 19:
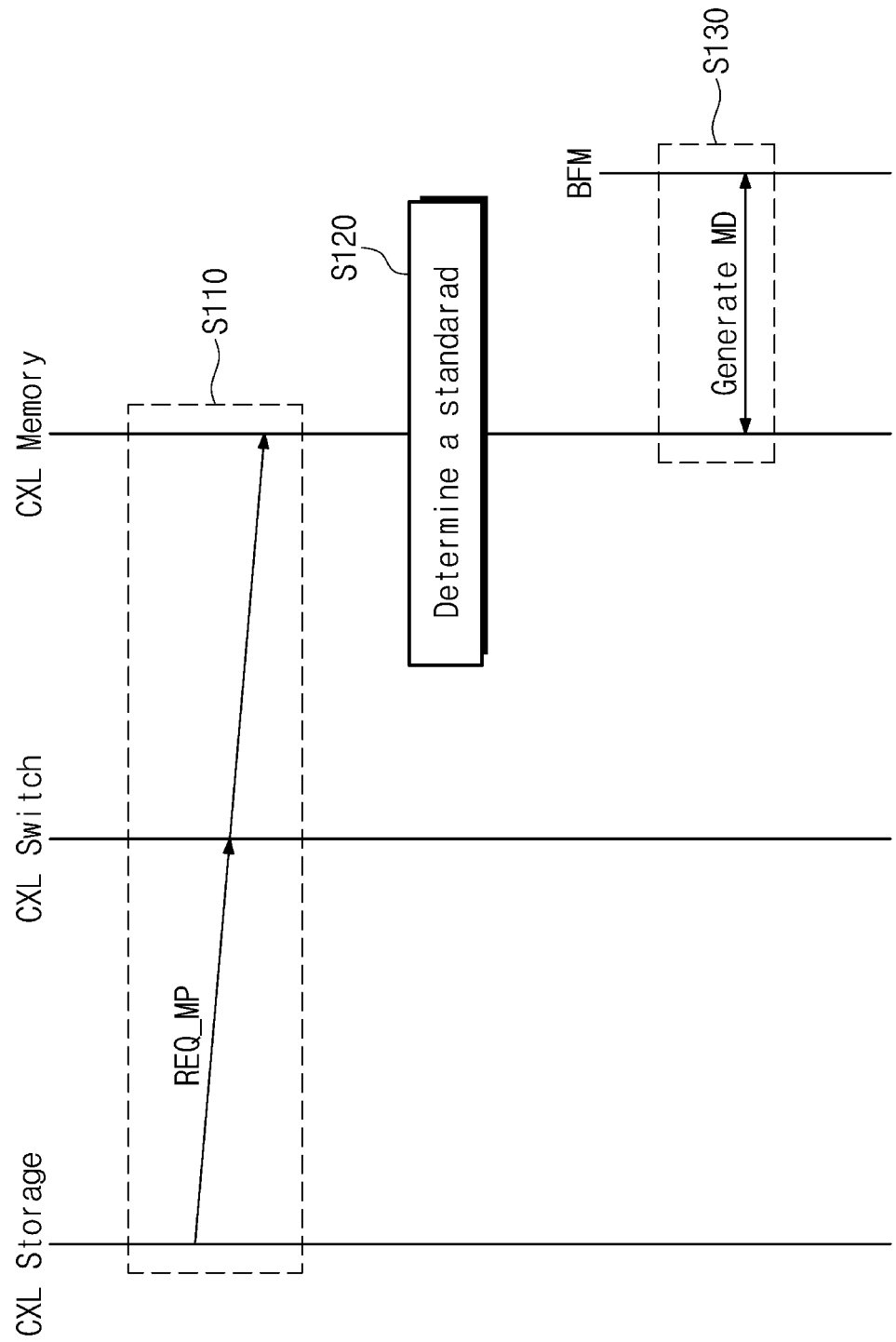
FIG. 19 is a flowchart describing a method of operating a computing system according to an example embodiment.

FIG. 19 is a flowchart describing a method of operating a computing system according to an example embodiment. Referring to FIG. 19, a computing system may include CXL storage, a CXL switch, and a CXL memory. The CXL storage may be target CXL storage, which stores user data to be currently processed, from among a plurality of CXL storages. The CXL storage, the CXL switch, and the CXL memory may respectively correspond to the first CXL storage 610_1, the CXL switch SW_CXL, and the CXL memory 620 of FIGS. 17 and 18.

In operation S110, the CXL storage of the computing system may provide a mapping request REQ_MP including metadata of the user data to the CXL memory through the CXL switch. In this case, the CXL storage may be the target CXL storage, which stores target user data, from among the plurality of CXL storages included in the computing device.

In an example embodiment, the CXL storage and the CXL memory of the computing system may communicate with each other in the P2P manner. For example, the CXL storage of the computing system may provide the mapping request for memory allocation to the CXL memory through the CXL switch in the P2P manner.

In an example embodiment, the CXL storage and the CXL memory of the computing system may communicate with each other based on the CXL interface. For example, the CXL storage of the computing system may provide the mapping request to the CXL memory through the CXL switch by using the CXL.mem, based on the CXL interface.

In operation S120, the CXL memory of the computing system may determine the standard corresponding to metadata based on the mapping request.

In an example embodiment, the computing system may determine the standard in consideration of the size of the user data. For example, the standard may include an allocation size of the map data to be allocated to the buffer memory BFM in the CXL memory. The allocation size may correspond to the size of the user data of the CXL storage. The metadata may include information indicating whether to allow the allocation size to coincide with the size of the user data.

In an example embodiment, the computing system may determine the standard in consideration of the total capacity of the CXL storage. For example, the standard may include an allocation size of the map data to be allocated to the buffer memory BFM in the CXL memory. The allocation size may correspond to the total capacity of the CLX storage. The metadata may include information indicating whether to allow the allocation size to coincide with the total capacity of the CXL storage.

In an example embodiment, the computing system may variably set a block size. The block size may indicate a block size corresponding to the logical block address of the user data. The block size may indicate the size of the user data that are processed based on one command (or a read command or a write command). The standard may include the block size corresponding to the logical block address of the user data. The block size may be set to a first block size optimized for high-speed read and write operations or may be set to a second block size optimized for the management of a large amount of data. The second block size may be greater than the first block size. However, example embodiments are not limited thereto. The computing system may variously determine the block size with reference to information about the block size included in the metadata.

In an example embodiment, the standard may include various detailed items associated with the map data. For example, the standard may include at least one of an allocation size of map data to be allocated to the buffer memory BFM, a block size corresponding to a logical block address of user data, the number of blocks corresponding to the logical block address of the user data, and a data structure of the logical block address of the user data.

In operation S130, the CXL memory of the computing system may generate the map data MD based on the standard determined in operation S120. The map data MD may indicate the relationship between the physical block address and the logical block address of the user data of the CXL storage.

In an example embodiment, the computing system may utilize a space, which is left after allocating the map data, as any other memory. For example, the CXL memory may include the buffer memory BFM. The map data MD generated in operation S130 may be allocated to the buffer memory BFM. Portions of the buffer memory BFM, to which the map data MD and map data associated with any other user data are not allocated, may be referred to as a free memory. The free memory may be used as a data buffer memory temporarily storing user data, a working memory for managing a plurality of CXL storages, a map data memory for managing any other map data of any other CXL storage, and a temporary memory used in garbage collection.

In an example embodiment, the computing system may maintain the map data of the CXL storage, even if the CXL storage is disconnected. For example, after operation S130, the CXL storage may be disconnected (refer to FIG. 14). The method of operating the computing system may further include providing a notification for disconnection of the CXL storage to the CXL memory through the CXL switch, maintaining the map data in the buffer memory BFM of the CXL memory during a reference time, by the CXL memory provided with the disconnection notification, before the reference time passes, providing a notification for re-connection of the CXL storage to the CXL memory through the CXL switch, and managing the user data based on the map data MD, by the CXL memory provided with the re-connection notification. In this case, the reference time may be a time period that is used as a reference for maintaining map data, with the disconnection of the CXL storage regarded as temporary disconnection, and may be variously changed by the user.

In an example embodiment, the computing system may perform a read operation based on the map data MD. For example, the computing system may further include a host connected with the CXL switch. After operation S130, the method of operating the computing system may further include receiving a read request for the user data from the host through the CXL switch, by the CXL storage, providing a read request for the map data MD to the CXL memory through the CXL switch based on the read request for the user data, by the CXL storage, providing the map data MD to the CXL storage through the CXL switch based on the read request for the map data, by the CXL memory, performing a read operation on the user data based on the map data MD, by the CXL storage, and providing a read response including the user data to the host through the CXL switch, by the CXL storage.

In an example embodiment, the computing system may generate the map data MD as a part of the write operation. For example, the computing system may further include a host connected with the CXL switch. The method of operating the computing system may further include receiving a write request for the user data from the host through the CXL switch, by the CXL storage before operation S110, and performing the write operation for the user data based on the write request for the user data, by the CXL storage before operation S110. In operation S110, the CXL storage of the computing system may include providing the mapping request REQ_MP to the CXL memory through the CXL switch based on performing the write operation.

In an example embodiment, the computing system may manage the user data distributed in the CXL storage. For convenience of description, the CXL storage, the user data, the metadata, the mapping request, the standard, and the map data described with reference to FIG. 19 are respectively referred to as first CXL storage, first user data, first metadata, a first mapping request, a first standard, and first map data.

For example, the computing system may further include a second CXL storage storing second user data. The method of operating the computing system may further include providing a second mapping request including second metadata of the second user data to the CXL memory through the CXL switch, by the second CXL storage, determining a second standard corresponding to the second metadata based on the second mapping request, by the CXL memory, and generating second map data indicating a relationship between a physical block address and a logical block address of the second user data based on the second standard, by the CXL memory.

As another example, the computing system may further include a second CLX storage storing second user data and third user data. The method of operating the computing system may further include providing a third mapping request including third metadata of the third user data to the CXL memory through the CXL switch, by the second CXL storage, determining a third standard corresponding to the third metadata based on the third mapping request, by the CXL memory, and generating third map data indicating a relationship between a physical block address and a logical block address of the third user data based on the third standard, by the CXL memory.

According to example embodiments, a computing system generating map data, and method of operating the same are provided.

Also, a computing system that efficiently uses a buffer memory by allocating only map data corresponding to the used storage device or the used user data to the buffer memory and is optimized for the high-speed data input/output and the management of a large amount of data by variably adjusting a block size, and a method of operating the same are provided.

While aspects of example embodiments have been described, it will be apparent to those of ordinary skill in the art that various changes and modifications may be made thereto without departing from the spirit and scope of the following claims.

What is claimed is:

1. A method of operating a computing system which comprises a plurality of storage devices, a memory device, and a switch, the method comprising:
providing a first mapping request comprising first metadata corresponding to first user data to the memory device through the switch, by a first storage device of the plurality of storage devices;
identifying a first standard corresponding to a first block size based on the first metadata, by the memory device;
generating first map data that has the first block size corresponding to the first standard, the first map data indicating a relationship between a first physical block address and a first logical block address of the first user data; and
allocating the first map data to a first portion of a buffer memory in the memory device based on the first block size, by the memory device.

2. The method of claim 1, wherein the providing the first mapping request is performed in a peer-to-peer (P2P) manner, by the first storage device.

3. The method of claim 1, wherein the providing the first mapping request is performed using a CXL.mem protocol based on a compute express link (CXL) interface, by the first storage device.

4. The method of claim 1, further comprising:
providing a second mapping request comprising second metadata corresponding to second user data to the memory device through the switch, by a second storage device of the plurality of storage devices;
identifying a second standard corresponding to a second block size based on the second metadata, by the memory device; and
generating second map data indicating a relationship between a second physical block address and a second logical block address of the second user data based on the second standard, and allocating the second map data to a second portion of the buffer memory based on the second block size, by the memory device.

5. The method of claim 4, further comprising:
providing a third mapping request comprising third metadata corresponding to third user data to the memory device through the switch, by the second storage device;
identifying a third standard corresponding to a third block size based on the third metadata, by the memory device; and
generating third map data indicating a relationship between a third physical block address and a third logical block address of the third user data based on the third standard, and allocating the third map data to a third portion of the buffer memory based on the third block size, by the memory device.

6. The method of claim 1, wherein the first standard indicates an allocation size of the first map data to be allocated to the buffer memory, and
wherein the allocation size corresponds to a size of the first user data of the first storage device.

7. The method of claim 1, wherein the first standard indicates an allocation size of the first map data to be allocated to the buffer memory in the memory device, and
wherein the allocation size corresponds to a total capacity of the first storage device.

8. The method of claim 1, wherein the first block size corresponds to the first logical block address, and
wherein the method further comprises identifying the first block size as:
a first size optimized for high-speed read and write operations; or
a second size greater than the first block size and optimized for management of a large amount of data.

9. The method of claim 1, wherein the first standard indicates the first block size and any one or any combination of:
an allocation size of the first map data to be allocated to the buffer memory;
a number of blocks corresponding to the first logical block address; and
a data structure of the first logical block address.

10. The method of claim 1, wherein a second portion of the buffer memory that is different from the first portion, is used as any one or any combination of:
a data buffer memory of the plurality of storage devices;
a working memory of the plurality of storage devices;
a map data memory managing second map data of second user data of second storage device of the plurality of storage devices; and
a temporary memory used in garbage collection.

11. The method of claim 1, further comprising:
providing a first notification for disconnection of the first storage device to the memory device through the switch;
maintaining the first map data in the buffer memory during a reference time, by the memory device provided with the first notification;
before the reference time passes, providing a second notification for re-connection of the first storage device to the memory device through the switch; and
managing the first user data based on the first map data, by the memory device provided with the second notification.

12. The method of claim 1, wherein the computing system further comprises a host communicating with the plurality of storage devices and the memory device through the switch, and
wherein the method further comprises:
receiving a user data read request for the first user data from the host through the switch, by the first storage device;
providing a map data read request for the first map data to the memory device through the switch based on the user data read request for the first user data, by the first storage device;
providing the first map data to the first storage device through the switch based on the map data read request for the first map data, by the memory device;
performing a read operation on the first user data based on the first map data, by the first storage device; and
providing a read response comprising the first user data to the host through the switch, by the first storage device.

13. The method of claim 1, wherein the computing system further comprises a host communicating with the plurality of storage devices and the memory device through the switch,
wherein the method further comprises:
receiving a write request for the first user data from the host through the switch, by the first storage device; and
performing a write operation for the first user data based on the write request for the first user data, by the first storage device, and
wherein the first mapping request is provided to the memory device through the switch based on the write operation being performed, by the first storage device.

14. The method of claim 1, wherein the providing the first mapping request comprises:
initializing the computing system;
providing a permission request to the memory device through the switch, by the first storage device;
authorizing the first storage device to use the memory device based on the permission request, by the memory device; and
providing the first mapping request to the memory device through the switch, by the first storage device based on the first storage device being authorized to use the memory device.

15. The method of claim 14, wherein the authorizing is performed based on a capacity of a free memory in the memory device being greater than a reference capacity and a number of storage devices that the memory device currently manages being smaller than a reference number.

16. A method of operating a computing system which comprises a plurality of storage devices, a memory device, and a switch, the method comprising:
providing a permission request to the memory device through the switch, by a target storage device of the plurality of storage devices;
authorizing the target storage device to use the memory device based on the permission request, by the memory device;
providing a mapping request comprising metadata corresponding to user data to the memory device through the switch, by the target storage device based on the target storage device being authorized;
identifying a standard corresponding to a block size based on the metadata, by the memory device;
generating map data that has the block size corresponding to the standard, the map data indicating a relationship between a logical address and a physical address of the user data; and
allocating the map data to a portion of a buffer memory in the memory device based on the block size, by the memory device.

17. The method of claim 16, wherein the standard indicates an allocation size of the map data to be allocated to the buffer memory, and
wherein the allocation size corresponds to:
a size of the user data of the target storage device; or
a total capacity of the target storage device.

18. A computing system comprising:
a plurality of storage devices comprising a first storage device storing first user data;
a memory device comprising a memory controller and a buffer memory; and
a switch configured to provide an interface between the plurality of storage devices and the memory device,
wherein the memory controller is configured to:
receive a first mapping request comprising first metadata corresponding to the first user data from the first storage device through the switch;
identify a first standard corresponding to a first block size based on the first metadata;
generate first map data that has the first block size corresponding to the first standard, the first map data indicating a mapping relationship between a first physical block address and a first logical block address of the first user data; and
allocate the first map data to a first portion of the buffer memory based on the first block size.

19. The computing system of claim 18, wherein the memory controller comprises at least one processor configured to execute:
a storage manager to recognize the first storage device and authorize the first storage device to use the memory device;
a mapping table manager to identify the first standard based on the first mapping request, generate the first map data based on the first standard, and allocate the first map data to the buffer memory;
an address mapper to generate the mapping relationship between the first physical block address and the first logical block address of the first user data; and
a metadata buffer to store the first metadata received from the first storage device through the switch.

20. The computing system of claim 18, wherein the plurality of storage devices further comprises a second storage device storing second user data, and
wherein the memory controller is further configured to:
receive a second mapping request comprising second metadata corresponding to the second user data from the second storage device through the switch;
identify a second standard corresponding to a second block size based on the second metadata; and
generate second map data indicating a mapping relationship between a second physical block address and a second logical block address of the second user data based on the second standard; and
allocate the second map data to a second portion of the buffer memory based on the second block size.

\* \* \* \* \*